(12) United States Patent
Yang et al.

(10) Patent No.: US 11,991,671 B2
(45) Date of Patent: May 21, 2024

(54) FEEDBACK DESIGNS FOR MULTI-USER MULTIPLE INPUT-MULTIPLE OUTPUT SIDELINK COMMUNICATION

(71) Applicant: QUALCOMM Incorporated, San Diego, CA (US)

(72) Inventors: Wei Yang, San Diego, CA (US); Ahmed Elshafie, San Diego, CA (US); Seyedkianoush Hosseini, San Diego, CA (US); Tugcan Aktas, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/463,481

(22) Filed: Aug. 31, 2021

(65) Prior Publication Data
US 2023/0062247 A1    Mar. 2, 2023

(51) Int. Cl.
*H04W 72/02* (2009.01)
*H04B 7/0452* (2017.01)
*H04L 1/00* (2006.01)
*H04L 1/1867* (2023.01)
*H04W 72/20* (2023.01)

(52) U.S. Cl.
CPC .......... *H04W 72/02* (2013.01); *H04L 1/0025* (2013.01); *H04L 1/1896* (2013.01); *H04W 72/20* (2023.01); *H04B 7/0452* (2013.01)

(58) Field of Classification Search
CPC ..... H04W 72/02; H04W 72/20; H04B 7/0452
See application file for complete search history.

(56) References Cited

U.S. PATENT DOCUMENTS

| | | | |
|---|---|---|---|
| 2020/0403737 A1* | 12/2020 | Yeo | H04L 1/1861 |
| 2021/0014834 A1* | 1/2021 | Akkarakaran | H04L 5/0082 |
| 2021/0135797 A1* | 5/2021 | Yang | H04L 1/1861 |
| 2022/0330316 A1* | 10/2022 | Lee | H04L 5/0053 |
| 2023/0069396 A1* | 3/2023 | Hwang | H04L 1/1896 |

* cited by examiner

*Primary Examiner* — Won Tae C Kim
(74) *Attorney, Agent, or Firm* — Holland & Hart LLP

(57) ABSTRACT

Methods, systems, and devices for wireless communications are described. In some systems, a first user equipment (UE) may operate in accordance with a multi-user (MU) multiple input-multiple output (MIMO) communication mode and may communicate with multiple other UEs over a same physical sidelink shared channel (PSSCH) resource. In some implementations, the first UE may transmit an indication of an MU-unicast mode for multiple sidelink transmissions to the multiple other UEs and may transmit the multiple sidelink transmissions to the multiple other UEs over the same PSSCH resource. In such implementations, the multiple other UEs may select physical sidelink feedback channel (PSFCH) resources to transmit feedback associated with the multiple sidelink transmissions in accordance with a PSFCH resource selection procedure associated with the MU-unicast mode. In accordance with the PSFCH resource selection procedure, the multiple other UEs may each select different PSFCH resources for their respective feedback transmissions.

30 Claims, 16 Drawing Sheets

FEEDBACK DESIGNS FOR MULTI-USER MULTIPLE INPUT-MULTIPLE OUTPUT SIDELINK COMMUNICATION

FIELD OF TECHNOLOGY

The following relates to wireless communications, including feedback designs for multi-user (MU) multiple input-multiple output (MIMO) sidelink communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a first UE may transmit a signal to a second UE and the second UE may, in response transmit feedback associated with the signal to indicate whether the signal was successfully received at the second UE. In some cases, the second UE may transmit the feedback over a sidelink feedback channel resource that is based on a slot and subchannel over which the first UE transmits the signal.

SUMMARY

The described techniques relate to improved methods, systems, devices, and apparatuses that support feedback designs for multi-user (MU) multiple input-multiple output (MIMO) sidelink communication. In some implementations, for example, a transmitting user equipment (UE) may indicate that a sidelink transmission is to be performed in accordance with an MU-MIMO mode and a receiving UE may select a physical sidelink feedback channel (PSFCH) resource over which to transmit feedback associated with the sidelink transmission based on the MU-MIMO mode. In other words, the receiving UE may select a PSFCH resource in accordance with a PSFCH resource selection procedure (e.g., a resource mapping) associated with the MU-MIMO mode. The transmitting UE may indicate that the sidelink transmission is to be performed in accordance with the MU-MIMO mode based on indicating that the sidelink transmission is associated with a mode or cast type that is dedicated for MU-MIMO communication, and such a mode or cast type may be referred to herein as an MU-unicast mode or cast type. In some implementations, the transmitting UE and the receiving UE may select a PSFCH resource for feedback associated with the sidelink transmission in accordance with a PSFCH resource selection procedure that is associated with (e.g., defined, specified, or dedicated for) MU-unicast.

In accordance with such a PSFCH resource selection procedure that is associated with MU-unicast, a UE may select different PSFCH resources for different sidelink transmissions even if the different sidelink transmissions occupy a same physical sidelink shared channel (PSSCH) resource. For example, a first UE (e.g., a transmitting UE) may perform a first sidelink transmission to a second UE (e.g., a first receiving UE) and may perform a second sidelink transmission to a third UE (e.g., a second receiving UE) over a same PSSCH resource and, in accordance with the PSFCH resource selection procedure that is associated with MU-unicast, the second UE and the third UE may select different PSFCH resources for feedback associated with the first sidelink transmission and the second sidelink transmission, respectively. In some implementations, and to facilitate the selection of different PSFCH resources for sidelink transmissions occupying a same PSSCH resource, the PSFCH resource selection procedure may be based on one or more of a source identifier (ID), a destination ID, a parameter associated with a demodulation reference signal (DMRS) port or pattern, an orthogonal cover code (OCC) index, any other parameter associated with a spatial multiplexing of the different sidelink transmissions, or a signaled offset.

DETAILED DESCRIPTION

Figure 1:
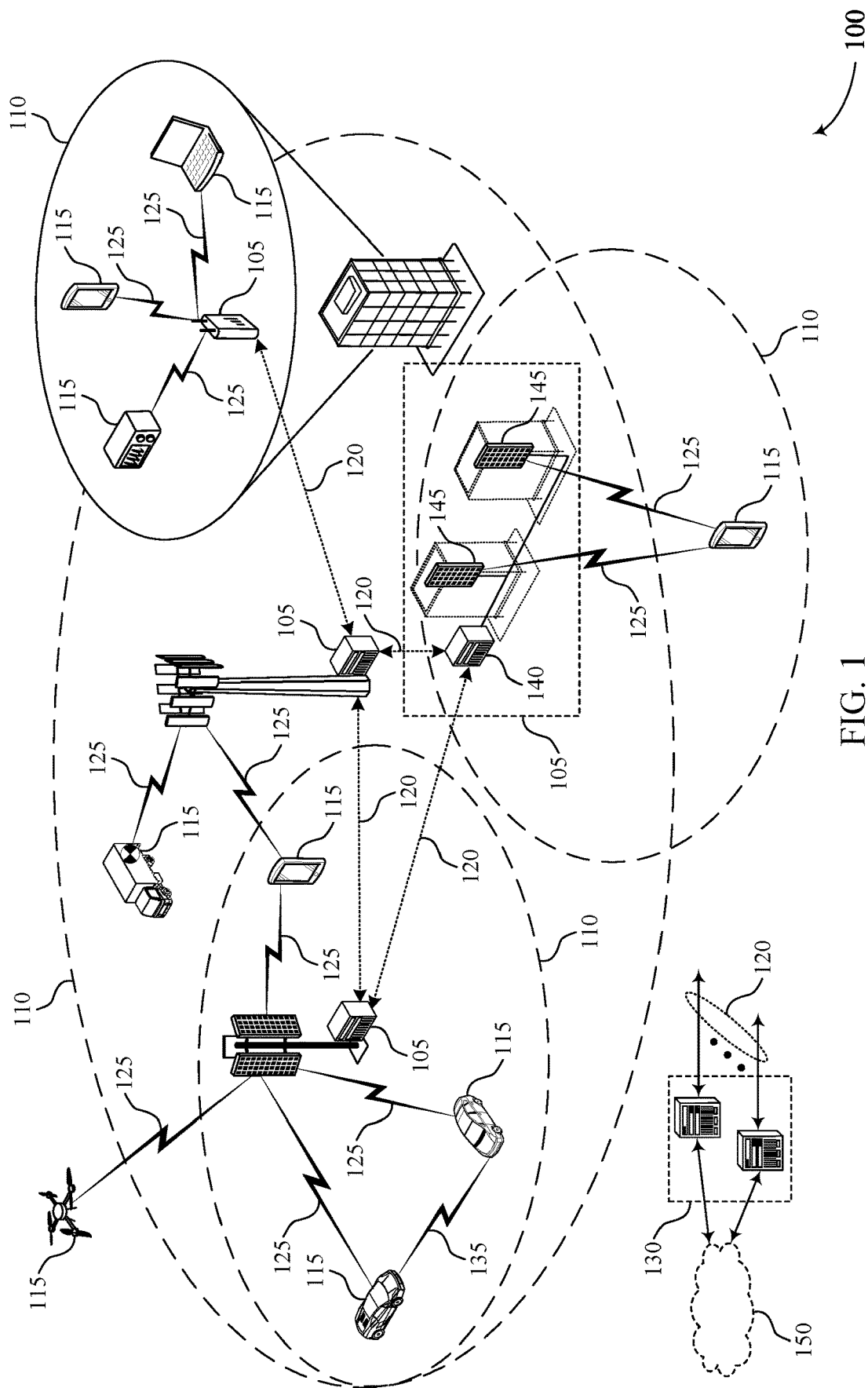
FIGS. 1 and 2 illustrate examples of wireless communications systems that support feedback designs for multi-user (MU) multiple input-multiple output (MIMO) sidelink communication in accordance with aspects of the present disclosure.

In some systems, a user equipment (UE) may communicate with one or more other UEs via one or more sidelinks and communicating UEs may provide sidelink feedback, such as sidelink hybrid automatic repeat request (HARQ) acknowledgement (ACK) feedback, responsive to receiving a sidelink transmission. For example, a first UE may transmit a first sidelink transmission to a second UE over a physical sidelink shared channel (PSSCH) resource and the second UE may transmit sidelink HARQ-ACK to the first UE associated with the first sidelink transmission over a physical sidelink feedback channel (PSFCH) resource. In some cases, the first UE and the second UE may select or otherwise identify the PSFCH resource over which the second UE transmits the sidelink HARQ-ACK in accordance with a PSFCH resource selection procedure. For unicast signaling, the PSFCH resource selection procedure may specify a correspondence between the PSSCH resource over which the first UE performs the first sidelink transmission and the PSFCH resource over which the second UE transmits the sidelink HARQ-ACK and may specify a correspondence between a function of a source identifier (ID) associated with the first UE and a cyclic shift of the PSFCH resource.

As such, in cases in which the first UE operates in an MU-MIMO mode and also performs a second sidelink transmission to a third UE over the same PSSCH resource, both the second UE and the third UE may select the same PSFCH resource over which to transmit sidelink HARQ-ACK to the first UE, which may result in the first UE being unable to successfully decode one or both of the feedback provided by the second UE and the third UE. Further, for an MU-MIMO scenario in which the first UE receives different sidelink transmissions from both the second UE and the third UE over a same PSSCH resource, the first UE also may select a same PSFCH resource for feedback to each UE as a result of a relatively high likelihood that the function of source IDs of the second UE and the third UE, although different, still point to a same cyclic shift.

In some implementations of the present disclosure, UEs communicating in accordance with an MU-MIMO mode associated with transmission of different signals to or from different UEs over a same PSSCH resource may specify a cast type that supports unique PSFCH resource selection for such different signals sent over the same PSSCH resource. For example, in addition to other cast types (e.g., unicast, negative ACK (NACK)-based groupcast, or ACK/NACK-based groupcast and broadcast), the UEs communicating in accordance with the MU-MIMO mode may indicate a mode or a cast type associated with a PSFCH resource selection procedure that is compatible with sidelink MU-MIMO communication. The mode or cast type that provides for such unique PSFCH resource selection in sidelink MU-MIMO modes may be referred to herein as MU-unicast, and a transmitting UE may indicate that some one or more sidelink transmissions are associated with MU-unicast to trigger the PSFCH resource selection procedure that facilitates unique PSFCH resource selection for sidelink transmissions occupying a same PSSCH resource. In some implementations, and to facilitate the selection of different PSFCH resources for sidelink transmissions occupying a same PSSCH resource, the MU-unicast PSFCH resource selection procedure may be based on one or more of a source ID, a destination ID, a parameter associated with a demodulation reference signal (DMRS) port or pattern, an orthogonal cover code (OCC) index, any other parameter associated with a spatial multiplexing of the different sidelink transmissions or that differentiates between two sidelink transmissions occupying a same PSSCH resource, or a signaled offset.

Particular aspects of the subject matter described herein may be implemented to realize one or more of the following potential advantages. As a result of providing a PSFCH resource selection procedure that facilitates unique PSFCH resource selection in sidelink MU-MIMO modes, communicating UEs may select unique PSFCH resources in deployments in which they otherwise may have a relatively high likelihood of selecting same PSFCH resources, which may reduce one or both of signaling collisions or interference between signaling. As such, the communicating UEs may experience a greater likelihood for successfully transmitting or receiving sidelink HARQ-ACK. Further, and as a result of such a greater likelihood for successful communication of sidelink HARQ-ACK, the communicating UEs may more accurately adjust communication parameters or more accurately select whether to perform a retransmission, which may provide for higher data rates, greater spectral efficiency, and greater system capacity.

Aspects of the disclosure are initially described in the context of wireless communications systems. Additionally, aspects of the disclosure are illustrated by and described with reference to a PSFCH resource selection procedure and a process flow. Aspects of the disclosure are further illustrated by and described with reference to apparatus diagrams, system diagrams, and flowcharts that relate to feedback designs for MU-MIMO sidelink communication.

FIG. 1 illustrates an example of a wireless communications system 100 that supports feedback designs for MU-MIMO sidelink communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some systems, such as the wireless communications system 100, two or more UEs 115 may communicate with each other via one or more sidelinks. In some deployment scenarios, for example, a first UE 115 may communicate with a second UE 115 and a third UE 115 in accordance with an MU-MIMO communication mode. As such, and in examples in which the first UE 115 is a primary UE 115, the first UE 115 may transmit a first sidelink transmission to the second UE 115 and may transmit a second sidelink transmission to the third UE 115 over a same PSSCH resource. Additionally or alternatively, the first UE 115 may receive a first sidelink transmission from the second UE 115 and may receive a second sidelink transmission from the third UE 115 over a same PSSCH resource. In some cases, a receiving UE (e.g., the second UE 115 and the third UE 115 or the first UE 115) may select a PSFCH resource over which to transmit feedback based on the PSSCH resource over which the associated sidelink transmission was sent, which may result in at least a relatively high likelihood for collisions in MU-MIMO deployment scenarios (e.g., as different signaling may frequently occupy a same PSSCH resource, thus resulting in selection of a same PSFCH resource for different feedback transmissions associated with the different signaling).

To facilitate unique PSFCH resource selection for different feedback transmissions associated with different sidelink signaling over a same PSSCH resource, a transmitting UE 115 may indicate an MU-unicast mode or cast type that is associated with a PSFCH resource selection procedure that facilitates such unique PSFCH resource selection. For example, in scenarios in which the first UE 115 is the transmitting UE 115, the first UE 115 may indicate, to at least one of the second UE and the third UE 115, the MU-unicast mode for the first sidelink transmission to the second UE 115 and the second sidelink transmission to the third UE 115. As such, the first UE 115, the second UE 115, and the third UE 115 may follow the associated PSFCH resource selection procedure and, based thereon, the second UE 115 may select a first PSFCH resource for feedback associated with the first sidelink transmission and the third UE 115 may select a second PSFCH resource for feedback associated with the second sidelink transmission. Likewise, the first UE 115 may monitor for feedback from the second UE 115 over the first PSFCH resource and may monitor for feedback from the third UE 115 over the second PSFSCH resource.

Figure 2:
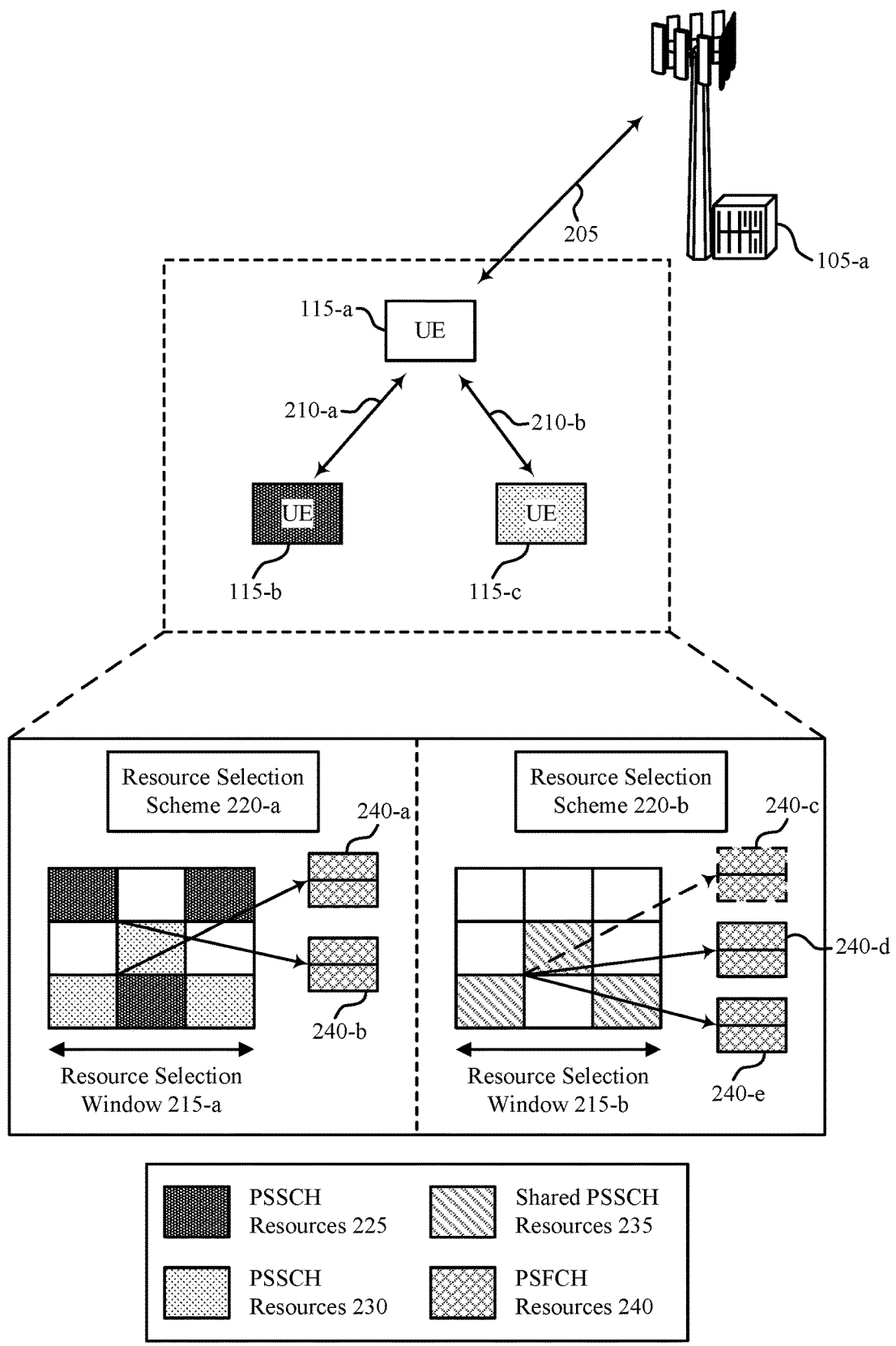

FIG. 2 illustrates an example of a wireless communications system 200 that supports feedback designs for MU-MIMO sidelink communication in accordance with aspects of the present disclosure. The wireless communications system 200 may implement or be implemented to realize one or more aspects of the wireless communications system 100. For example, the wireless communications system 200 may illustrate communication between a UE 115-a, a UE 115-b, a UE 115-c, and a base station 105-a, which may be examples of corresponding devices described herein, including with reference to FIG. 1. In some implementations, the UEs 115 may communicate in accordance with a sidelink MU-MIMO communication mode and may support a PSFCH resource selection procedure that is associated with (e.g., dedicated or specified for) the sidelink MU-MIMO communication mode via an MU-unicast mode or cast type.

For example, the wireless communications system 200, which may be an example of an NR system, may support sidelink for various applications, including V2X applications, public safety applications or use cases, or other commercial use cases. In some deployment scenarios, and as shown in FIG. 2, the UE 115-a may communicate with the base station 105-a via a communication link 205, may communicate with the UE 115-b via a sidelink 210-a, and may communicate with the UE 115-c via a sidelink 210-b. In such deployment scenarios, the UE 115-a may be referred to or understood as a primary UE 115. Further, in some examples, the UE 115-b and the UE 115-c may be referred to or understood as remote UEs 115 and may or may not have a communication link to the base station 105-a (e.g., one or both of the UE 115-b or the UE 115-c may be in coverage or out-of-coverage of the base station 105-a). In some aspects, any one or more of the UEs 115 (e.g., such as the UE 115-b and the UE 115-c) may be examples of wearables, such as smart glasses, smart goggles, a smart watch, or the like. Further, such a notion of the UE 115-a being a primary UE 115 and the UE 115-b and the UE 115-c being remote UEs 115 is described for the purpose of example, and implementations of the present disclosure may be applicable to or compatible with any scenario or case in which one UE 115 communicates with two or more other UEs 115 at the same time (e.g., regardless of the form factors or capabilities of such UEs 115). Further, although FIG. 2 illustrates a scenario in which the UE 115-a communicates with the UE 115-b and the UE 115-c (e.g., two UEs 115), the UE 115-a and the UEs 115 with which the UE 115-a communicates may implement the techniques described herein in scenarios in which the UE 115-a communicates with any number of UEs 115 (e.g., three UEs 115, four UEs 115, five UEs 115, etc.).

The UEs 115 within the wireless communications system 200 may support various resource selection schemes 220, including a resource selection scheme 220-a according to which communication between the UE 115-a and the UE 115-b is sent over different resources than over which communication between the UE 115-a and the UE 115-c is sent and a resource selection scheme 220-b according to which communication between the UE 115-a and the UE 115-b is sent over the same resources as over which communication between the UE 115-a and the UE 115-c is sent. For example, in accordance with the resource selection scheme 220-a, the UE 115-a may transmit to or receive from the UE 115-b over PSSCH resources 225 and may transmit to or receive from the UE 115-c over PSSCH resources 230 within a resource selection window 215-a. As such, the communication between the UE 115-a and the UE 115-b and the communication between the UE 115-a and the UE 115-c may use orthogonal or non-overlapping PSSCH resources.

In accordance with the resource selection scheme 220-b, the UE 115-a may transmit to or receive from the UE 115-b and may transmit to or receive from the UE 115-c over shared PSSCH resources 235 within a resource selection window 215-b. Such communication with multiple other UEs 115 over the shared PSSCH resources 235 may be referred to or understood as an MU-MIMO communication mode and may improve resource efficiency (as fewer resources are used for a same amount of communication). For example, as part of the MU-MIMO communication mode, the UE 115-a (e.g., the primary UE 115) may transmit on the shared PSSCH resources 235 to multiple remote UEs 115 (e.g., the UE 115-b and the UE 115-c) via different directional beams or via different DMRS ports. Additionally or alternatively, the UE 115-a may guide the remote UEs 115 to transmit on one or more ports based on transmitting an indication to the remote UEs 115 indicating on which ports each of the remote UEs 115 may transmit. For example, in scenarios in which the UE 115-a schedules another UE 115 (such as one or both of the UE 115-b and the UE 115-c) or under a sidelink resource allocation Mode 1, the remote UEs 115 (e.g., the UE 115-b and the UE 115-c) may receive instruction or scheduling information to transmit on the same shared PSSCH resources 235 while ensuring separability at the receiver (e.g., the UE 115-a).

Further, although illustrated and described in the context in which two MU-MIMO assignments or allocations completely overlap, two MU-MIMO assignments or allocations may alternatively partially overlap in one or more of time and frequency. For example, if a starting subchannel index or a size of an allocation for two UEs 115 are different, some partial overlapping may occur or the issue (e.g., of colliding PSFCH resources) may not arise. In examples in which some partial overlapping between two MU-MIMO assignments or allocations occurs, corresponding PSFCH resources may collide if a mapping to PSFCH resources is based on starting subchannel index. For example, two PSSCH allocations may have a same starting allocation (e.g., a same starting subchannel index) but differently sized allocations. In such examples, the two PSSCH allocations may have corresponding PSFCH resources that collide (e.g., at least partially overlap in time and frequency) if PSFCH location is based on starting allocation (e.g., starting subchannel index) of the corresponding PSSCH allocation.

In some examples, the UEs 115 may employ or follow a PSFCH resource selection procedure according to which a PSFCH resource 240 is based on a corresponding PSSCH resource. For example, if the UEs 115 are communicating in accordance with the resource selection scheme 220-a and if a first sidelink transmission is sent over a first PSSCH resource 225 and a second sidelink transmission is over a first PSSCH resource 230, the UEs 115 may identify, select, or otherwise determine that feedback associated with the first sidelink transmission is to be sent over a PSFCH resource 240-b based on the first sidelink transmission being sent over the first PSSCH resource 225 and that feedback associated with the second sidelink transmission is to be sent over a PSFCH resource 240-a based on the second sidelink transmission being sent over the first PSSCH resource 230. In other words, different PSSCH resources may correspond to or may otherwise be associated with different PSFCH resources 240 such that, in accordance with the resource selection scheme 220-a, feedback transmissions may avoid colliding with each other by virtue of the orthogonal and non-overlapping nature of the resource selection scheme 220-a.

On the other hand, however, if the UEs 115 are communicating in accordance with the resource selection scheme 220-b and if a first sidelink transmission (e.g., to or from the UE 115-b) is sent over a first shared PSSCH resource 235 and a second sidelink transmission (e.g., to or from the UE 115-c) is sent over the same first shared PSSCH resource 235, the UEs 115 may identify, select, or otherwise determine that feedback associated with the first sidelink transmission and feedback associated with the second sidelink transmission is to be sent over a same PSFCH resource 240-c. As such, a feedback transmission associated with the first sidelink transmission may collide with (e.g., occupy the same PSFCH resource 240-c as) a feedback transmission associated with the second sidelink transmission.

For example, for MU-MIMO scenarios and for both the two links from the remote UEs 115 to the primary UE 115 and the two links from the primary UE 115 to the remote UEs 115, the resources that the UEs 115 use for PSSCH communication between the primary UE 115 and the remote UEs 115 may be the same, which may result in a collision over the PSFCH resource 240 that the UEs 115 use for the two communication links. In other words, for instance, the PSFCH resources 240 that the UEs 115 may use for feedback for two sidelink transmissions that occupy a same shared PSSCH resource 235 may be scheduled on a same physical resource block (PRB) and with a same cyclic shift. For links from the primary UE 115 to the corresponding remote UEs 115, for example, the source IDs may be the same (e.g., as the primary UE 115 is the source for both sidelink transmissions), which may result in a same PSFCH resource 240 being selected for the links. For the reverse link (e.g., the link from the remote UEs 115 to the primary UE 115), the source IDs may be different (e.g., as each transmitting remote UE 115 has a different source ID), but the probability that the different source IDs lead to or result in a same PSFCH resource 240 being selected is still relatively high. Additional details relating to such a PSFCH resource selection procedure that is based on a corresponding PSSCH resource are described herein, including with reference to FIG. 3.

In some implementations, to facilitate a selection of unique or different PSFCH resources 240 for feedback responsive to sidelink transmissions over a same shared PSSCH resource 235, the UEs 115 may support a mode or a cast type for MU-MIMO with a mapping method (e.g., a resource mapping method that is dedicated for sidelink MU-MIMO communication). Such a mode or cast type may be referred to herein as an MU-unicast mode or cast type and the UEs 115 may support such an MU-unicast mode in addition to other cast types, such as in addition to unicast, NACK-based groupcast, or ACK/NACK-based groupcast and broadcast. In some implementations, the MU-unicast mode may be associated with a PSSCH-to-PSFCH mapping rule or procedure that is different from the PSSCH-to-PSFCH mapping rules or procedures associated with existing cast types.

For example, for a PSSCH transmission scheduled with or in accordance with the MU-unicast mode, associated UEs 115 (e.g., a UE 115 transmitting the feedback and a UE 115 receiving the feedback) may identify, select, or otherwise determine a PSFCH resource for the PSSCH transmission based on both a source ID and a destination ID. In such examples, the associated UEs 115 may select the PSFCH resource using a function of both the source ID of the UE 115 that transmits the PSSCH transmission and the destination ID of the UE 115 that receives the PSSCH transmission (and transmits the feedback in response to the sidelink transmission). Such a function may include, for example, a calculation for a PSFCH resource i=(source ID+destination ID)mod k, where mod refers to a modulo operation and k denotes a total number of PSFCH resources that are associated with a same PSSCH resource (e.g., a same subchannel index). In some aspects, such a PSFCH resource selection that is based on both source ID and destination ID may be similar to a PSFCH resource selection for managed groupcast, but used for unicast signaling if the PSSCH transmission is scheduled as MU-unicast.

Additionally or alternatively, for the PSSCH transmission scheduled with or in accordance with the MU-unicast mode, the associated UEs 115 may identify, select, or otherwise determine a PSFCH resource for the PSSCH transmission based on a parameter associated with one or more DMRS ports for the PSSCH transmission, the source ID of the UE 115 that transmits the PSSCH transmission and, optionally, the destination ID of the UE 115 that receives the PSSCH transmission (and transmits the feedback in response to the sidelink transmission). Such a parameter that is associated with the one or more DMRS ports for the PSSCH transmission may include any one or more of an index or value corresponding to a DMRS port used for the PSSCH transmission, an index or value corresponding to a first DMRS port used for the PSSCH transmission (if multiple DMRS ports are used), a DMRS pattern associated with the PSSCH transmission, or a code division multiplexing (CDM) group index associated with the PSSCH transmission. In some examples, the associated UEs 115 may select the PSFCH resource using a function (e.g., including a modulo operation) of the parameter and the source ID (and, optionally, the destination ID).

Additionally or alternatively, for the PSSCH transmission scheduled with or in accordance with the MU-unicast mode, the associated UEs 115 may identify, select, or otherwise determine a PSFCH resource for the PSSCH transmission based on a parameter associated with one or more DMRS ports for a control transmission, such as a physical sidelink control channel (PSCCH) transmission, associated with (e.g., scheduling) the PSSCH transmission or an OCC index for the PSCCH transmission, the source ID of the UE 115 that transmits the PSSCH transmission and, optionally, the destination ID of the UE 115 that receives the PSSCH transmission (and transmits the feedback in response to the sidelink transmission). Such a parameter that is associated with the one or more DMRS ports for the PSCCH transmission may include any one or more of an index or value corresponding to a DMRS port used for the PSCCH transmission, an index or value corresponding to a first DMRS port used for the PSCCH transmission (if multiple DMRS ports are used), a DMRS pattern associated with the PSCCH transmission, or a CDM group index associated with the PSCCH transmission. In some examples, the associated UEs 115 may select the PSFCH resource using a function (e.g., including a modulo operation) of the parameter or the OCC index and the source ID (and, optionally, the destination ID).

Additionally or alternatively, for the PSSCH transmission scheduled with or in accordance with the MU-unicast mode, the associated UEs 115 may identify, select, or otherwise determine a PSFCH resource for the PSSCH transmission based on the source ID of the UE 115 that transmits the PSSCH transmission and an offset. The UE 115 that transmits the PSSCH transmission may indicate the offset to the UE 115 receiving the PSSCH transmission via sidelink control information (SCI), such as one or both of first stage SCI (which may be referred to as SCI-1) or second stage SCI (which may be referred to as SCI-2), or the offset may be configured via radio resource control (RRC) signaling. For example, one or both of the UE 115 that transmits the PSSCH transmission or the base station 105-a may transmit an indication of the offset (such as an indication of a value for the offset) via RRC signaling. In some examples, the associated UEs 115 may select the PSFCH resource using a function (e.g., including a modulo operation) of the source ID and the offset (and, optionally, the destination ID).

In accordance with such a PSFCH resource selection procedure associated with MU-unicast and MU-MIMO communication, two PSSCH transmissions over a same shared PSSCH resource 235 may be associated with different PSFCH resources 240. In other words, the PSFCH resource selection procedure associated with MU-unicast may include or otherwise result in a multiplexing of PSFCH resources 240 for MU-MIMO in sidelink and, specifically, to randomize the PSFCH resource 240 based on destination ID or DMRS port index, among other examples. For example, if the UE 115-a transmits a first PSSCH transmission to the UE 115-b over a first shared PSSCH resource 235 and transmits a second PSSCH transmission to the UE 115-c over the same first shared PSSCH resource 235, the UE 115-b may select to transmit feedback associated with the first PSSCH transmission over a PSFCH resource 240-d while the UE 115-c may select to transmit feedback associated with the second PSSCH transmission over a PSFCH resource 240-e. Likewise, the UE 115-a may monitor for the feedback from the UE 115-b over the PSFCH resource 240-d and may monitor for the feedback from the UE 115-c over the PSFCH resource 240-e. Similarly, if the UE 115-a receives a first PSSCH transmission from the UE 115-b over the first shared PSSCH resource 235 and receives a second PSSCH transmission from the UE 115-c over the same first shared PSSCH resource 235, the UE 115-a may transmit feedback associated with the first PSSCH transmission over the PSFCH resource 240-d and may transmit feedback associated with the second PSSCH transmission over the PSFCH resource 240-e. Likewise, the UE 115-b may monitor for feedback over the PSFCH resource 240-d and the UE 115-c may monitor for feedback over the PSFCH resource 240-e.

As described herein, various options for the PSFCH resource selection procedure associated with the MU-unicast mode include using DMRS ports for PSFCH resource determination or selection. Such a DMRS port-based PSFCH resource selection procedure may be a natural alternative to a PSSCH resource-based resource selection procedure because, for MU-MIMO, different links may use different DMRS ports (e.g., orthogonal DMRS ports or nonorthogonal DMRS ports), either via coordination with the base station 105-a (e.g., in a sidelink resource allocation Mode 1) or via inter-UE coordination (e.g., in a sidelink resource allocation Mode 2). If the DMRS ports are different, such a DMRS port-based PSFCH resource selection procedure naturally leads to a differentiation between different links that communicating UEs 115 may use to orthogonalize the PSFCH channels associated with the different links.

Further, to support the described PSFCH resource selection procedure for an MU-unicast mode in scenarios in which the UEs 115 operate in accordance with a sidelink resource allocation Mode 1, the base station 105-a may assign or allocate one time-frequency resource to the UE 115-a (e.g., the primary UE 115) and the UE 115-a may decide to allocate the assigned or allocated resource to the multiple remote UEs 115 (e.g., the UE 115-b and the UE 115-c) via the links from the UE 115-a to the remote UEs 115. In such examples, the base station 105-a may be unaware as to whether the one time-frequency resource is used for a single-UE transmission or for an MU-MIMO transmission by the UE 115-a and, accordingly, the base station 105-a may allocate one physical uplink control channel (PUCCH) resource for HARQ-ACK feedback (e.g., HARQ-ACK feedback for the signaling sent by the UE 115-a over the allocated one time-frequency resource) from the UE 115-a to the base station 105-a. In other words, the MU-MIMO operation of the UE 115-a over sidelinks 210 may be transparent to the base station 105-a (which may simplify operation of the base station 105-a).

Accordingly, in some implementations, the UE 115-a may transmit one bit HARQ-ACK feedback to the base station 105-a over the one PUCCH resource. In such implementations, the UE 115-a may transmit an indication of a NACK if communication between the UE 115-a and any remote UEs 115 is in error or fails. Otherwise, the UE 115-a may transmit an indication of an ACK if communication between the UE 115-a and each of the remote UEs 115 is successful.

In some other examples, the base station 105-a may be more involved in the MU-MIMO scheduling decisions over sidelinks 210 and, in such examples, the base station 105-a may be aware of a number of UEs 115 with which the UE 115-a communicates over one PSSCH resource. As such, the base station 105-a may assist the UE 115-a to orthogonalize the DMRS ports used in the different links from the UE 115-a to the multiple remote UEs 115. Further, in some implementations (e.g., and in a sidelink resource allocation Mode 1), the UE 115-a may report, to the base station 105-a, multiple sidelink HARQ-ACK bits for the corresponding multiple links in a same PUCCH resource. In such implementations, the UE 115-a may provide the base station 105-a with a greater understanding of how many layers may be used for a retransmission from the UE 115-a, which may facilitate a more efficient utilization of spatial domain resources (e.g., DMRS ports).

The UE 115-a, using the multiple sidelink HARQ-ACK bits, may report per link HARQ-ACK feedback or may report per DMRS port (e.g., per spatial layer) HARQ-ACK feedback. For example, if the UE 115-a reports per link HARQ-ACK, the UE 115-a may report one HARQ-ACK bit for the sidelink 210-a and one HARQ-ACK bit for the sidelink 210-b to indicate whether a PSSCH transmission over each link is successfully received. Alternatively, if the UE 115-a reports per DMRS port HARQ-ACK, the UE 115-a may report a number of HARQ-ACK bits for the sidelink 210-a based on (e.g., equivalent to) a number of DMRS ports associated with a PSSCH transmission over the sidelink 210-a and may additionally report a number of HARQ-ACK bits for the sidelink 210-b based on (e.g., equivalent to) a number of DMRS ports associated with a PSSCH transmission over the sidelink 210-b.

As such, the UE 115-a may indicate, to the base station 105-a, an amount of layers that the UE 115-a may use for a retransmission. For example, if a sidelink 210 consumes two DMRS ports (e.g., two layers), the UE 115-a may send two HARQ-ACK bits (indicating a same ACK or NACK result depending on whether an associated PSSCH transmission is successfully received) to the base station 105-a for that sidelink 210. The base station 105-a may receive the HARQ-ACK bits, identify or otherwise determine how many layers the UE 115-a may use for a retransmission by counting how many NACKs the base station 105-a receives, and may provide the UE 115-a with a resource allocation for a retransmission based on the identified or determined number of layers. For example, if the base station 105-a receives two NACK bits, the base station 105-a may provide the UE 115-a with a resource allocation associated with two layers for a retransmission of a PSSCH transmission. Accordingly, the base station 105-a may assist in providing a more suitable resource allocation for MU-MIMO communication between the UEs 115, which may further support robust HARQ-ACK feedback for MU-MIMO over sidelink (e.g., in addition to the greater reliability provided by the PSFCH resource selection procedure associated with the MU-unicast mode).

Figure 3:
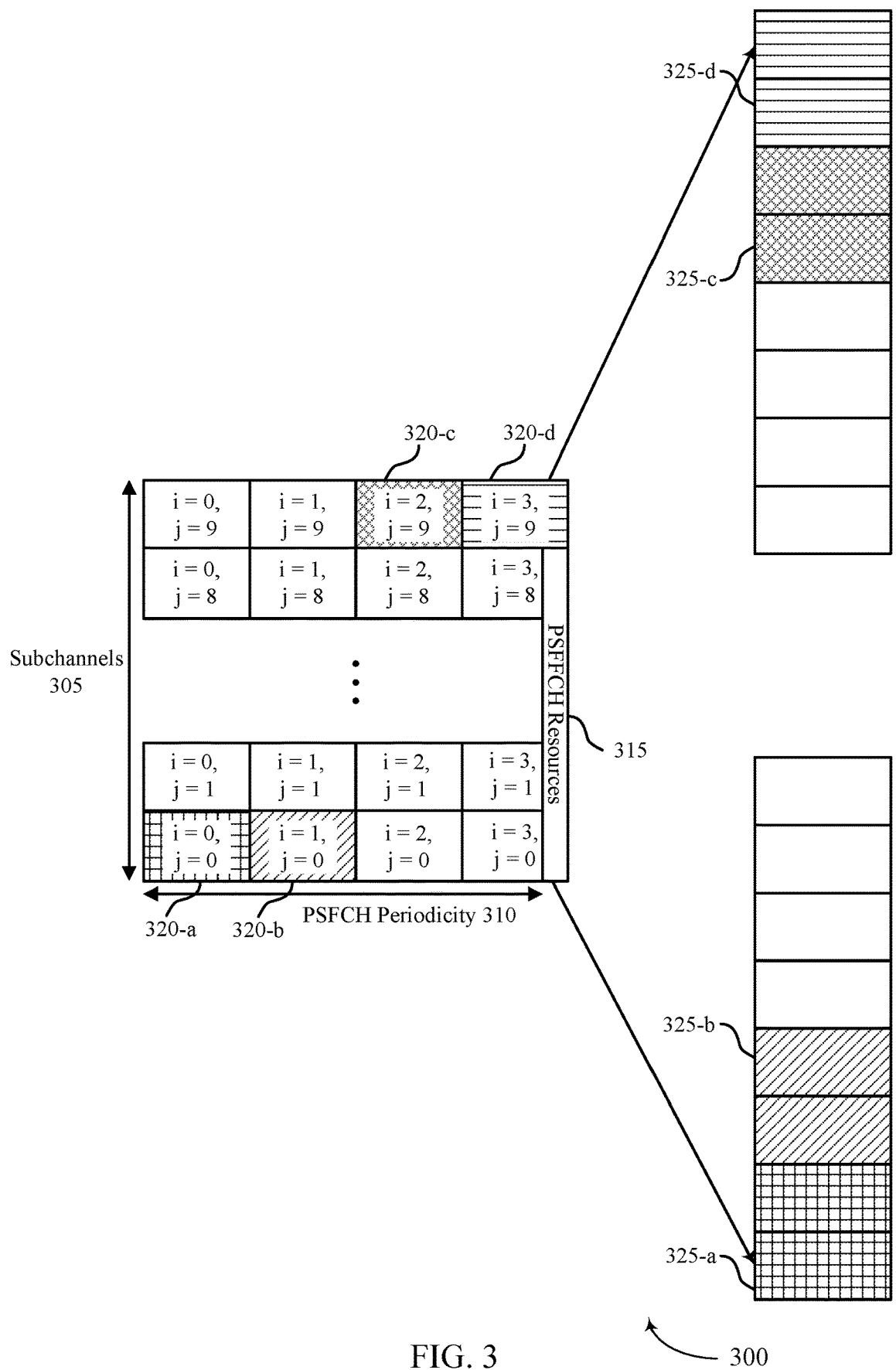
FIG. 3 illustrates an example of a sidelink feedback selection procedure that supports feedback designs for MU-MIMO sidelink communication in accordance with aspects of the present disclosure.

FIG. 3 illustrates an example of a sidelink feedback selection procedure 300 that supports feedback designs for MU-MIMO sidelink communication in accordance with aspects of the present disclosure. The sidelink feedback selection procedure 300 may implement or be implemented to realize one or more aspects of the wireless communications system 100 or the wireless communications system 200. For example, multiple UEs 115 may select PSFCH resources in accordance with the sidelink feedback selection procedure 300, and such multiple UEs 115 may be examples of corresponding devices described herein, including with reference to FIGS. 1 and 2. In some examples, the sidelink feedback selection procedure 300 may be an example of a PSSCH resource-based selection rule or mapping rule that UEs may employ for some cast types.

The sidelink feedback selection procedure 300 may illustrate a resource grid of a number of subchannels 305 that are associated with a PSFCH periodicity 310 such that a number of PSFCH resources 315 may follow each set of a number of slots corresponding to the PSFCH periodicity 310. The number of subchannels 305 may be referred to as $N_{subch}$ and, in an example, $N_{subch}=10$. The PSFCH periodicity 310 may be referred to as $N_{PSSCH}^{PSFCH}$ and, in an example, $N_{PSSCH}^{PSFCH}=4$ (e.g., such that a PSFCH may occur every four slots). The number of PSFCH resources 315 may be referred to as $M_{subch\_slot}^{PSFCH}$ and, in an example, $M_{subch,slot}^{PSFCH}=80/(4*10)=2$, which may be associated with or otherwise provide for 80 PRBs for PSFCH. The UE may allocate PSFCH PRBs from a number $M_{PRB,set}^{PSFCH}$ of PRBs to a PSSCH resource at a slot i and a subchannel j in accordance with equation 1, shown below, where $0 \le i \le N_{PSSCH}^{PSFCH}$ and $0 \le j \le N_{subch}$.

$$[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH}-1] \quad (1)$$

In the example of FIG. 3, each subchannel may be associated with two PSFCH PRBs, each PRB may have K cyclic shifts, and feedback may be sent on one PRB using one cyclic shift. In some examples, the PSFCH resource may be selected based on an index i, where i=(source ID+destination ID)mod 2K for managed-groupcast and i=source ID mod 2K for unicast.

As such, different PSSCH resources 320 may correspond to different PSFCH resources 325 and different source IDs may be associated with different cyclic shifts for a PSFCH resource 325. As shown in the sidelink feedback selection procedure 300 (e.g., via a matching of illustrative patterns), a PSSCH resource 320-a may correspond to a PSFCH resource 325-a, a PSSCH resource 320-b may correspond to a PSFCH resource 325-b, a PSSCH resource 320-c may correspond to a PSFCH resource 325-c, and a PSSCH resource 320-d may correspond to a PSFCH resource 325-d. In some aspects, and as also shown in the sidelink feedback selection procedure 300, each PSFCH resource 325 may include two PSFCH PRBs.

Figure 4:
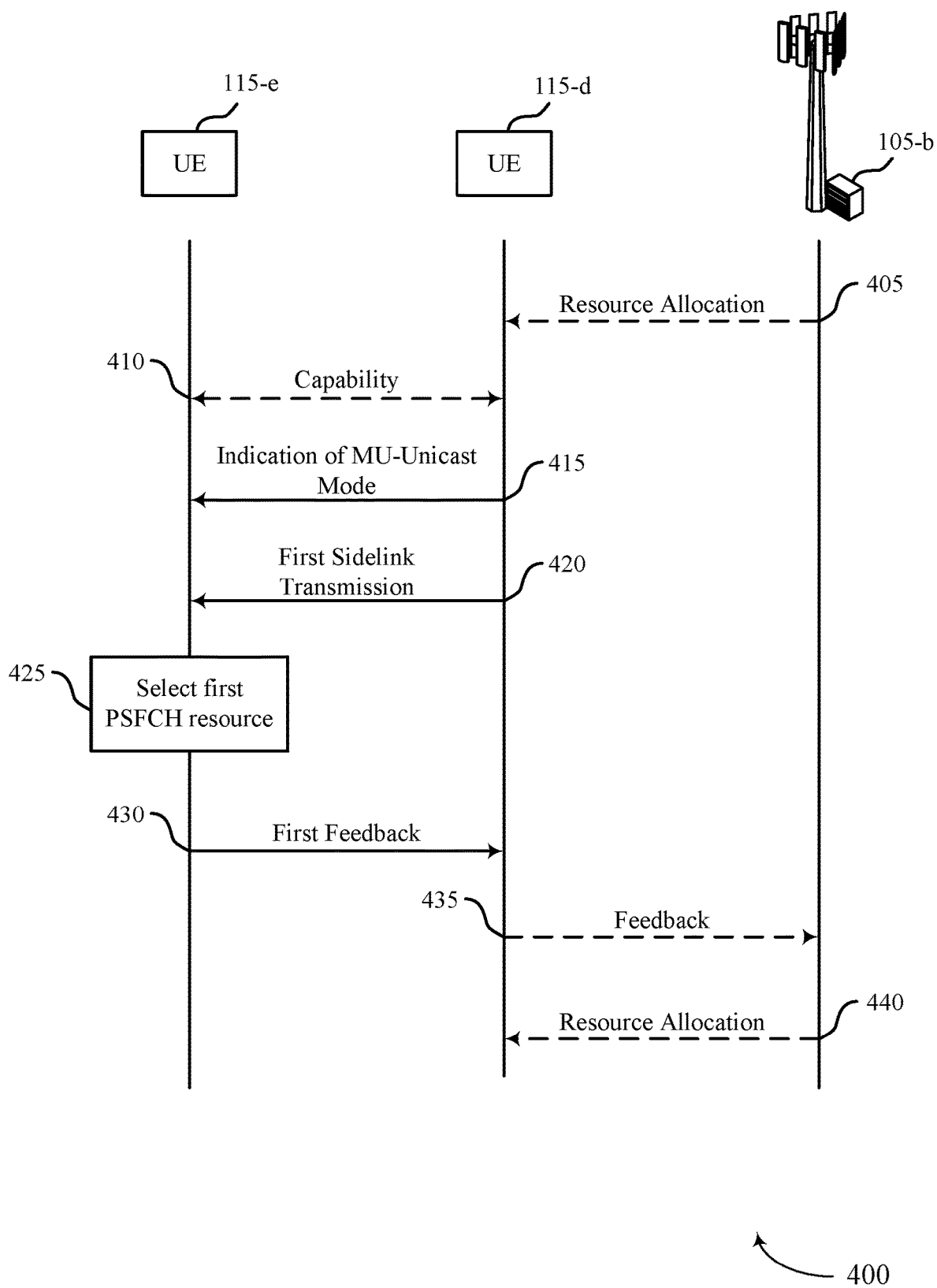
FIG. 4 illustrates an example of a process flow that supports feedback designs for MU-MIMO sidelink communication in accordance with aspects of the present disclosure.

FIG. 4 illustrates an example of a process flow 400 that supports feedback designs for MU-MIMO sidelink communication in accordance with aspects of the present disclosure. The process flow 400 may implement or be implemented to realize one or more aspects of the wireless communications system 100 or the wireless communications system 200. For example, the process flow 400 may illustrate communication between a base station 105-b, a UE 115-d, and a UE 115-e, which may be examples of corresponding devices described herein, including with reference to FIGS. 1 and 2. In some implementations, the UE 115-d and the UE 115-e may communicate in accordance with a sidelink MU-MIMO communication mode and may employ a PSFCH resource selection procedure that is associated with (e.g., dedicated or specified for) sidelink MU-MIMO.

In the following description of the process flow 400, the operations may be performed (such as reported or provided) in a different order than the order shown, or the operations performed by the example devices may be performed in different orders or at different times. Some operations also may be omitted from the process flow 400, or other operations may be added to the process flow 400. Further, although some operations or signaling may be shown to occur at different times for discussion purposes, these operations may actually occur at the same time or otherwise concurrently.

At 405, the UE 115-d may, in some implementations, receive a resource allocation for sidelink communication from the base station 105-b. For example, the UE 115-d may receive the resource allocation for the sidelink communication from the base station 105-b in examples in which the UE 115-d communicates in accordance with a sidelink resource allocation Mode 1. In some examples, the transmission of the resource allocation to the UE 115-d may be referred to as a transmission of signaling associated with a first sidelink transmission (e.g., as the UE 115-d may use the resource allocation for the first sidelink transmission) or an indication of an MU-unicast mode for sidelink communication (e.g., if the base station 105-b is aware of the sidelink MU-MIMO communication mode). In some examples, the resource allocation may be associated with a PUCCH resource over which the UE 115-d may provide feedback for sidelink communication to the base station 105-b, and the PUCCH resource may carry one or multiple feedback bits.

At 410, the UE 115-d and the UE 115-e may, in some implementations, exchange an indication of a capability for MU-MIMO communication or an MU-unicast mode or cast type. In some examples, the UE 115-e may transmit the indication of the capability of the UE 115-e to the UE 115-d. Additionally or alternatively, the UE 115-d may transmit the indication of the capability of the UE 115-d to the UE 115-e. Additionally or alternatively, one or both of the UE 115-d and the UE 115-e may transmit an indication of their respective capabilities for MU-MIMO communication or the MU-unicast mode or cast type and, in some implementations, the base station 105-b may provide the resource allocation in accordance with the capability of one or both of the UE 115-d and the UE 115-e for MU-MIMO communication or the MU-unicast mode or cast type. In some examples, the base station 105-b may provide a number of DMRS ports in the resource allocation in examples in which at least one of the UE 115-d or the UE 115-e are capable of MU-MIMO communication or the MU-unicast mode or cast type (or in examples in which the UE 115-d requests a resource allocation for MU-MIMO communication).

At 415, the UE 115-d may transmit, to the UE 115-e, an indication of an MU-unicast mode for the first sidelink transmission. In some examples, the UE 115-d may transmit the indication of the MU-unicast mode for the first sidelink transmission via control signaling scheduling the first sidelink transmission, such as SCI. In some examples, the UE 115-d may, in addition to indicating the MU-unicast mode or optionally via other signaling, signal an offset or an offset value for the first sidelink transmission. In addition or as an alternative to providing the offset or offset value via SCI, one or both of the UE 115-d or the base station 105-b may signal the offset or offset value via RRC signaling. Such an offset value may be associated with a PSFCH resource selection procedure associated with the MU-unicast mode.

At 420, the UE 115-d may transmit, to the UE 115-e, the first sidelink transmission. The UE 115-d may transmit the first sidelink transmission over a sidelink shared channel, such as a PSSCH, and, as such, the first sidelink transmission may be referred to as a first PSSCH transmission. In some examples, the first sidelink transmission from the UE 115-d may be referred to as a transmission of signaling associated with the first sidelink transmission. In some examples, the resource allocation that the UE 115-d receives at 405 may include the sidelink shared channel over which the UE 115-d transmits the first sidelink transmission.

In some implementations, the UE 115-d may also transmit, to a third UE 115, a second sidelink transmission over the sidelink shared channel. For example, the UE 115-d may operate in accordance with a sidelink MU-MIMO communication mode and may perform multiple sidelink transmissions over a same sidelink shared resource (e.g., over a same PSSCH resource). Additionally or alternatively, the UE 115-e may receive, from a third UE 115, a second sidelink transmission over the sidelink shared channel (e.g., over a same PSSCH resource). For example, the UE 115-e may operate in accordance with a sidelink MU-MIMO communication mode and may receive multiple sidelink transmissions over the same sidelink shared channel resource.

At 425, the UE 115-e may select a first sidelink feedback channel resource for first feedback associated with the first sidelink transmission. In some examples, the UE 115-e may select the first sidelink feedback channel resource based on a resource mapping (e.g., a PSFCH resource selection procedure) associated with (e.g., dedicated or specified for) the MU-unicast mode. In some examples, the UE 115-e may select the first sidelink feedback channel resource based on a source ID associated with the UE 115-d and a destination ID associated with the UE 115-e. For example, a function of the source ID and the destination ID may indicate the first sidelink feedback channel resource in accordance with the resource mapping associated with the MU-unicast mode. In some other examples, the UE 115-a may select the first sidelink feedback channel resource based on a parameter associated with one or more DMRS ports for the sidelink shared channel resource and a source ID associated with the UE 115-d. For example, a function of the parameter and the source ID may indicate the first sidelink feedback channel resource in accordance with the resource mapping associated with the MU-unicast mode.

In some other examples, the UE 115-e may select the first sidelink feedback channel resource based on one or both of a parameter associated with one or more DMRS ports or an OCC index for a sidelink control channel resource (e.g., a PSSCH resource) associated with the first sidelink transmission and a source ID associated with the UE 115-d. For example, a function of one or both of the parameter associated with the one or more DMRS ports or the OCC index for the sidelink control channel resource and the source ID may indicate the first sidelink shared channel resource in accordance with the resource mapping associated with the MU-unicast mode. In some other examples, the UE 115-e may select the first sidelink feedback channel resource based on the source ID associated with the UE 115-d and the offset value. For example, a function of the source ID and the offset value may indicate the first sidelink feedback channel resource in accordance with the resource mapping associated with the MU-unicast mode.

At 430, the UE 115-e may transmit the first feedback associated with the first sidelink transmission over the selected first sidelink feedback channel resource. Likewise, the UE 115-d may monitor for the first feedback associated with the first sidelink transmission over the first sidelink feedback channel resource. In some implementations, for example, the UE 115-d may monitor over the first sidelink feedback channel resource in accordance with the resource mapping associated with the MU-unicast mode.

In some implementations, the UE 115-d may also monitor for, and receive, second feedback from the third UE 115 over a second sidelink feedback channel resource based on the resource mapping associated with the MU-unicast mode. Additionally or alternatively, the UE 115-e may transmit, to the third UE 115, second feedback associated with the second sidelink transmission over a second sidelink feedback channel resource based on the resource mapping associated with the MU-unicast mode.

At 435, the UE 115-d may, in some implementations, transmit feedback associated with the sidelink communication (e.g., the first sidelink transmission and the second sidelink transmission) to the base station 105-b over the PUCCH resource. In some examples, the feedback associated with the sidelink communication may include one feedback bit (e.g., a single HARQ-ACK bit) that indicates an ACK if both the first sidelink transmission and the second sidelink transmission are successful or a NACK if at least one of the first sidelink transmission or the second sidelink transmission is unsuccessful. In some other examples, the feedback associated with the sidelink communication may include multiple feedback bits (e.g., multiple HARQ-ACK bits) that indicate feedback per link or per spatial layer.

At 440, the UE 115-*d* may, in some implementations, receive, from the base station 105-*b*, a resource allocation for a retransmission of one or both of the first sidelink transmission or the second sidelink transmission based on a quantity of spatial layers for which NACK is transmitted. For example, the resource allocation may include a number of DMRS ports based on how many NACKs the base station 105-*b* receives in examples in which the UE 115-*d* reports feedback at 435 per DMRS port. In some examples, such a resource allocation may be referred to as a retransmission grant.

Figure 5:
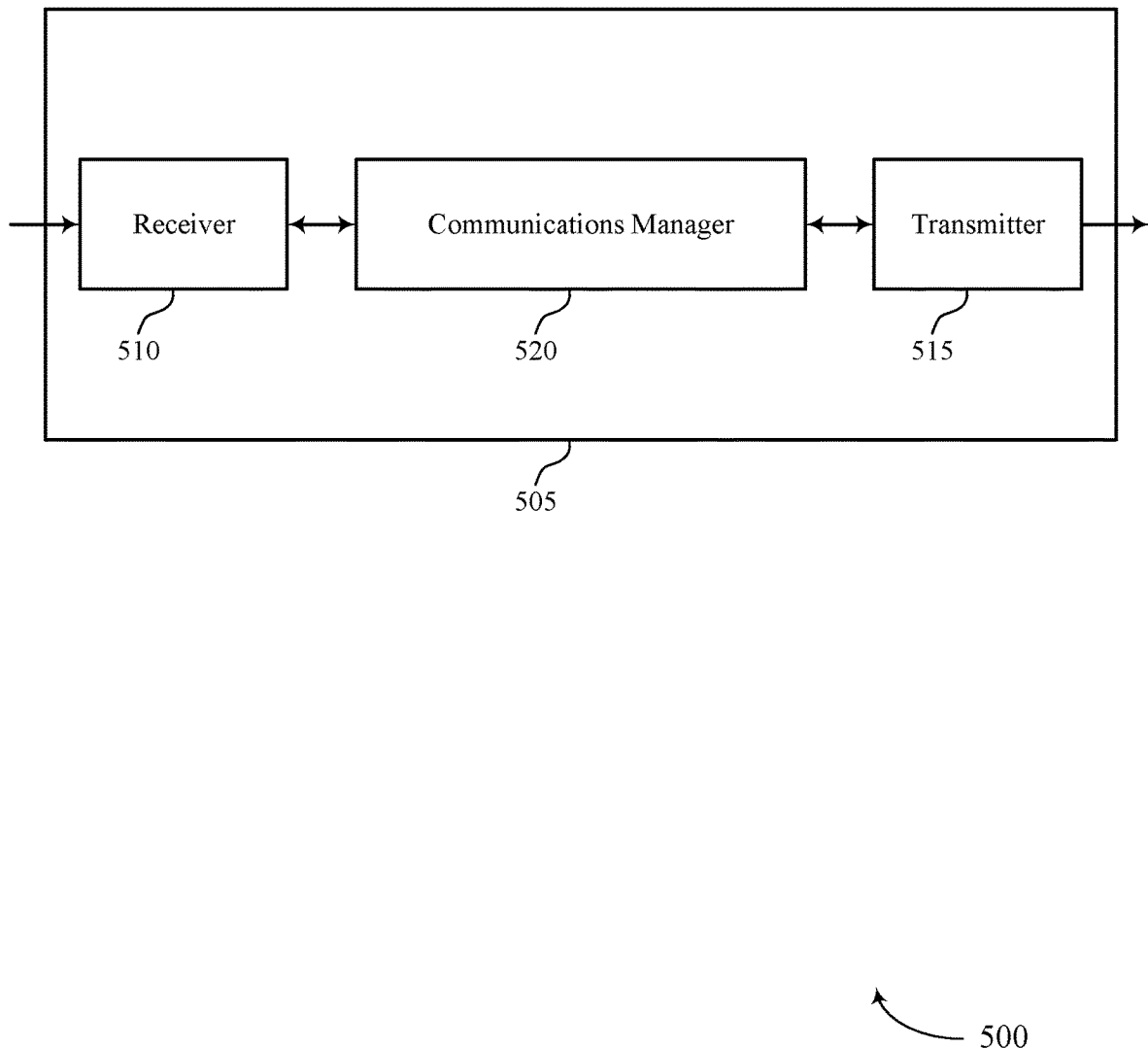
FIGS. 5 and 6 show block diagrams of devices that support feedback designs for MU-MIMO sidelink communication in accordance with aspects of the present disclosure.

FIG. 5 shows a block diagram 500 of a device 505 that supports feedback designs for MU-MIMO sidelink communication in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback designs for MU-MIMO sidelink communication). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback designs for MU-MIMO sidelink communication). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of feedback designs for MU-MIMO sidelink communication as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first device in accordance with examples as disclosed herein. For example, the communications manager 520 may be configured as or otherwise support a means for transmitting, to a second device, an indication of an MU-unicast mode for a first sidelink transmission. The communications manager 520 may be configured as or otherwise support a means for transmitting, to the second device, signaling associated with the first sidelink transmission. The communications manager 520 may be configured as or otherwise support a means for receiving, from the second device, feedback associated with the first sidelink transmission based on the MU-unicast mode.

Additionally or alternatively, the communications manager 520 may support wireless communication at a first UE in accordance with examples as disclosed herein. For example, the communications manager 520 may be configured as or otherwise support a means for receiving, from a second UE, an indication of an MU-unicast mode for a first sidelink transmission. The communications manager 520 may be configured as or otherwise support a means for receiving, from the second UE, the first sidelink transmission over a sidelink shared channel resource. The communications manager 520 may be configured as or otherwise support a means for transmitting, to the second UE, first feedback associated with the first sidelink transmission over a first sidelink feedback channel resource that is based on a resource mapping associated with the MU-unicast mode.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
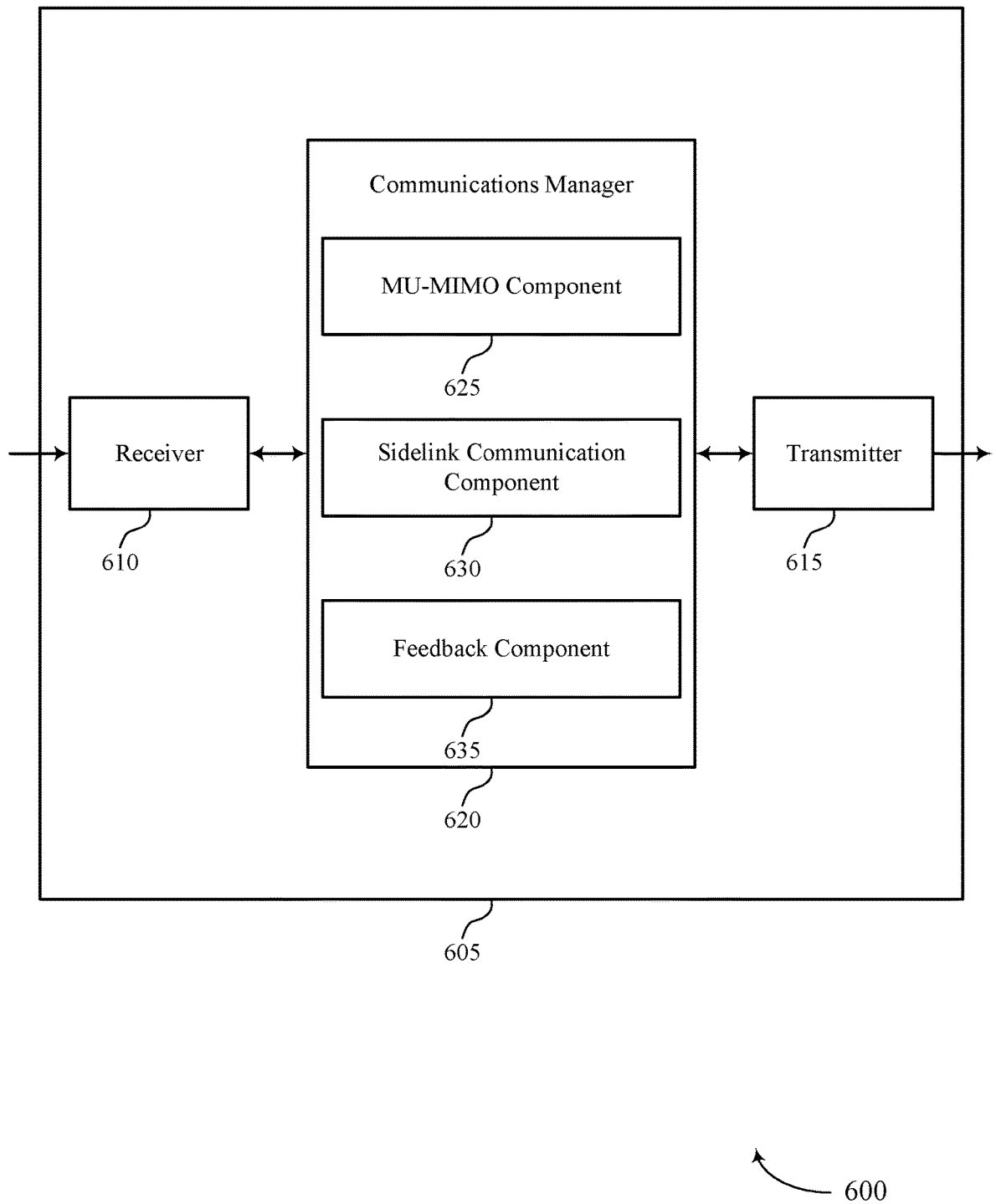

FIG. 6 shows a block diagram 600 of a device 605 that supports feedback designs for MU-MIMO sidelink communication in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback designs for MU-MIMO sidelink communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback designs for MU-MIMO sidelink communication). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of feedback designs for MU-MIMO sidelink communication as described herein. For example, the communications manager 620 may include an MU-MIMO component 625, a sidelink communication component 630, a feedback component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. The MU-MIMO component 625 may be configured as or otherwise support a means for transmitting, to a second device, an indication of an MU-unicast mode for a first sidelink transmission. The sidelink communication component 630 may be configured as or otherwise support a means for transmitting, to the second device, signaling associated with the first sidelink transmission. The feedback component 635 may be configured as or otherwise support a means for receiving, from the second device, feedback associated with the first sidelink transmission based on the MU-unicast mode.

Additionally or alternatively, the communications manager 620 may support wireless communication at a first UE in accordance with examples as disclosed herein. The MU-MIMO component 625 may be configured as or otherwise support a means for receiving, from a second UE, an indication of an MU-unicast mode for a first sidelink transmission. The sidelink communication component 630 may be configured as or otherwise support a means for receiving, from the second UE, the first sidelink transmission over a sidelink shared channel resource. The feedback component 635 may be configured as or otherwise support a means for transmitting, to the second UE, first feedback associated with the first sidelink transmission over a first sidelink feedback channel resource that is based on a resource mapping associated with the MU-unicast mode.

Figure 7:
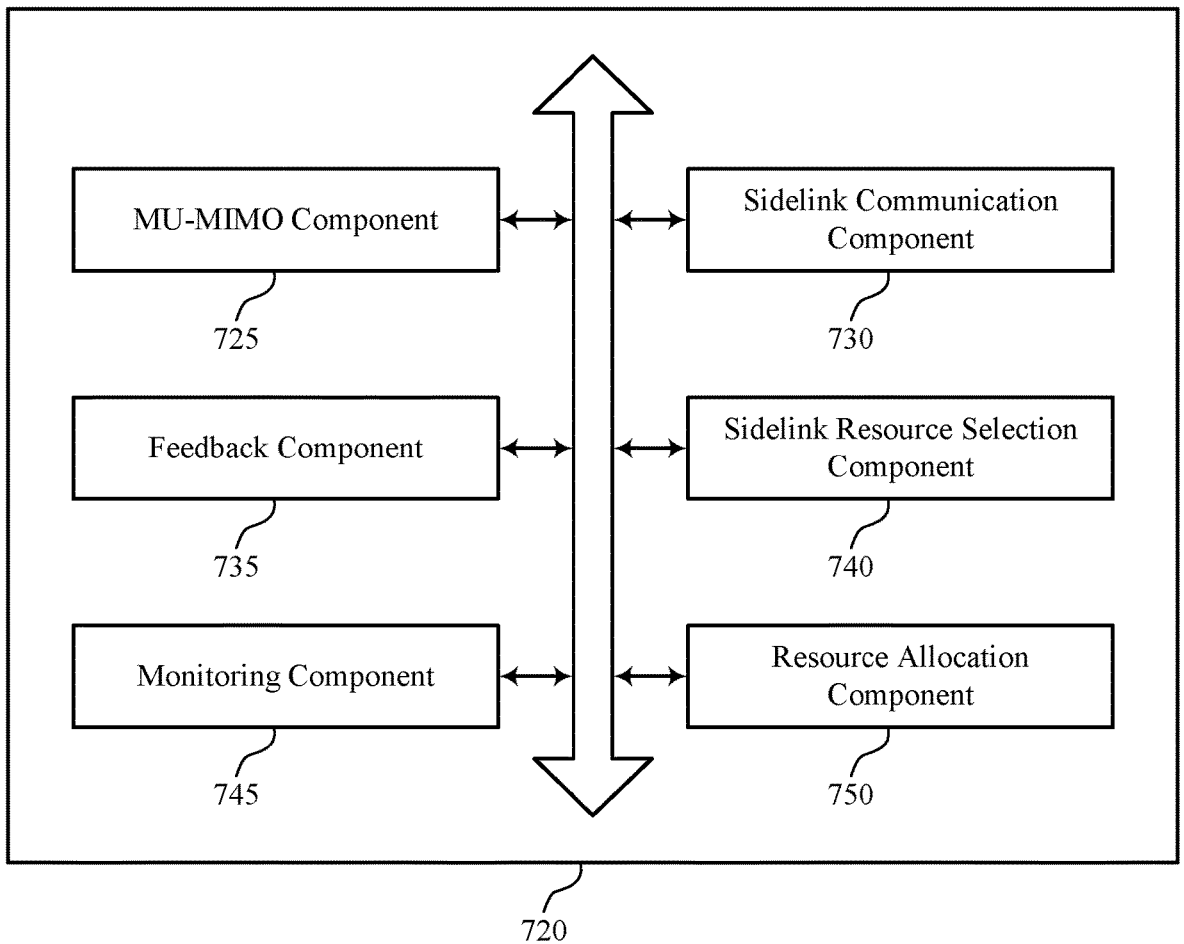
FIG. 7 shows a block diagram of a communications manager that supports feedback designs for MU-MIMO sidelink communication in accordance with aspects of the present disclosure.

FIG. 7 shows a block diagram 700 of a communications manager 720 that supports feedback designs for MU-MIMO sidelink communication in accordance with aspects of the present disclosure. The communications manager 720 may be an example of aspects of a communications manager 520, a communications manager 620, or both, as described herein. The communications manager 720, or various components thereof, may be an example of means for performing various aspects of feedback designs for MU-MIMO sidelink communication as described herein. For example, the communications manager 720 may include an MU-MIMO component 725, a sidelink communication component 730, a feedback component 735, a sidelink resource selection component 740, a monitoring component 745, a resource allocation component 750, or any combination thereof. Each of these components may communicate, directly or indirectly, with one another (e.g., via one or more buses).

The communications manager 720 may support wireless communication at a first device in accordance with examples as disclosed herein. The MU-MIMO component 725 may be configured as or otherwise support a means for transmitting, to a second device, an indication of an MU-unicast mode for a first sidelink transmission. The sidelink communication component 730 may be configured as or otherwise support a means for transmitting, to the second device, signaling associated with the first sidelink transmission. The feedback component 735 may be configured as or otherwise support a means for receiving, from the second device, feedback associated with the first sidelink transmission based on the MU-unicast mode.

In some examples, the first device may be an example of a first UE and the second device may be an example of a second UE, and the sidelink communication component 730 may be configured as or otherwise support a means for transmitting, to the second UE, the first sidelink transmission over a sidelink shared channel resource. In such examples, the feedback component 735 may be configured as or otherwise support a means for receiving first feedback from the second UE over a first sidelink feedback channel resource that is based on a resource mapping associated with the MU-unicast mode.

In some examples, the sidelink communication component 730 may be configured as or otherwise support a means for transmitting, to a third UE, a second sidelink transmission over the sidelink shared channel resource. In some examples, the feedback component 735 may be configured as or otherwise support a means for receiving second feedback from the third UE over a second sidelink feedback channel resource that is based on the resource mapping associated with the MU-unicast mode.

In some examples, the monitoring component 745 may be configured as or otherwise support a means for monitoring over the first sidelink feedback channel resource for the first feedback from the second UE based on a source ID associated with the first UE and a destination ID associated with the second UE, where a function of the source ID associated with the first UE and the destination ID associated with the second UE indicates the first sidelink feedback channel resource in accordance with the resource mapping associated with the MU-unicast mode.

In some examples, the monitoring component 745 may be configured as or otherwise support a means for monitoring over the first sidelink feedback channel resource for the first feedback from the second UE based on a parameter associated with one or more DMRS ports for the sidelink shared channel resource and a source ID associated with the first UE, where a function of the parameter and the source ID associated with the first UE indicates the first sidelink feedback channel resource in accordance with the resource mapping associated with the MU-unicast mode.

In some examples, the monitoring component 745 may be configured as or otherwise support a means for monitoring over the first sidelink feedback channel resource for the first feedback from the second UE based on one or both of a parameter associated with one or more DMRS ports or an OCC index for a sidelink control channel resource associated with the first sidelink transmission and a source ID associated with the first UE, where a function of one or both of the parameter or the OCC index and the source ID associated with the first UE indicates the first sidelink feedback channel resource in accordance with the resource mapping associated with the MU-unicast mode.

In some examples, the monitoring component 745 may be configured as or otherwise support a means for monitoring over the first sidelink feedback channel resource for the first feedback from the second UE based on a source ID associated with the first UE and an offset value, where a function of the source ID associated with the first UE and the offset value indicates the first sidelink feedback channel resource in accordance with the resource mapping associated with the MU-unicast mode.

In some examples, the feedback component 735 may be configured as or otherwise support a means for transmitting, to the second UE, an indication of the offset value via SCI signaling or RRC signaling.

In some examples, the resource allocation component 750 may be configured as or otherwise support a means for receiving, from a base station, a resource allocation including a single sidelink shared channel resource for sidelink communication and a single uplink control channel resource for feedback associated with the sidelink communication. In some examples, the sidelink communication component 730 may be configured as or otherwise support a means for transmitting, to a third UE, a second sidelink transmission over the single sidelink shared channel resource, where the first sidelink transmission to the second UE is also transmitted over the single sidelink shared channel resource. In some examples, the feedback component 735 may be configured as or otherwise support a means for transmitting, to the base station over the single uplink control channel resource, feedback associated with the first sidelink transmission and the second sidelink transmission.

In some examples, the feedback associated with the first sidelink transmission and the second sidelink transmission includes one feedback bit, and the one feedback bit indicates an ACK if both the first sidelink transmission and the second sidelink transmission are successful or a NACK if at least one of the first sidelink transmission or the second sidelink transmission is unsuccessful.

In some examples, the feedback associated with the first sidelink transmission and the second sidelink transmission includes multiple feedback bits, and the multiple feedback bits indicate an ACK or a NACK for the first sidelink transmission and the second sidelink transmission.

In some examples, the multiple feedback bits indicate the feedback associated with the first sidelink transmission and the second sidelink transmission per link or per spatial layer. In some examples, the first sidelink transmission and the second sidelink transmission are associated with one or more spatial layers.

In some examples, the multiple feedback bits indicate a NACK for each of a quantity of spatial layers associated with one or both of the first sidelink transmission or the second sidelink transmission, and the resource allocation component 750 may be configured as or otherwise support a means for receiving, from the base station, a resource allocation for a retransmission of one or both of the first sidelink transmission or the second sidelink transmission based on the quantity of spatial layers for which NACKs is transmitted.

Additionally or alternatively, the communications manager 720 may support wireless communication at a first UE in accordance with examples as disclosed herein. In some examples, the MU-MIMO component 725 may be configured as or otherwise support a means for receiving, from a second UE, an indication of an MU-unicast mode for a first sidelink transmission. In some examples, the sidelink communication component 730 may be configured as or otherwise support a means for receiving, from the second UE, the first sidelink transmission over a sidelink shared channel resource. In some examples, the feedback component 735 may be configured as or otherwise support a means for transmitting, to the second UE, first feedback associated with the first sidelink transmission over a first sidelink feedback channel resource that is based on a resource mapping associated with the MU-unicast mode.

In some examples, the sidelink communication component 730 may be configured as or otherwise support a means for receiving, from a third UE, a second sidelink transmission over the sidelink shared channel resource. In some examples, the feedback component 735 may be configured as or otherwise support a means for transmitting, to the third UE, second feedback associated with the second sidelink transmission over a second sidelink feedback channel resource that is based on the resource mapping associated with the MU-unicast mode.

In some examples, the sidelink resource selection component 740 may be configured as or otherwise support a means for selecting the first sidelink feedback channel resource for the first feedback associated with the first sidelink transmission based on a source ID associated with the second UE and a destination ID associated with the first UE, where a function of the source ID associated with the second UE and the destination ID associated with the first UE indicates the first sidelink feedback channel resource in accordance with the resource mapping associated with the MU-unicast mode.

In some examples, the sidelink resource selection component 740 may be configured as or otherwise support a means for selecting the first sidelink feedback channel resource for the first feedback associated with the first sidelink transmission based on a parameter associated with one or more DMRS ports for the sidelink shared channel resource and a source ID associated with the second UE, where a function of the parameter and the source ID associated with the second UE indicates the first sidelink feedback channel resource in accordance with the resource mapping associated with the MU-unicast mode.

In some examples, the sidelink resource selection component 740 may be configured as or otherwise support a means for selecting the first sidelink feedback channel resource for the first feedback associated with the first sidelink transmission based on one or both of a parameter associated with one or more DMRS ports or an OCC index for a sidelink control channel resource associated with the first sidelink transmission and a source ID associated with the second UE, where a function of one or both of the parameter or the OCC index and the source ID associated with the second UE indicates the first sidelink feedback channel resource in accordance with the resource mapping associated with the MU-unicast mode.

In some examples, the sidelink resource selection component 740 may be configured as or otherwise support a means for selecting the first sidelink feedback channel resource for the first feedback associated with the first sidelink transmission based on a source ID associated with the second UE and an offset value, where a function of the source ID associated with the second UE and the offset value indicates the first sidelink feedback channel resource in accordance with the resource mapping associated with the MU-unicast mode.

In some examples, the feedback component 735 may be configured as or otherwise support a means for receiving, from the second UE, an indication of the offset value via SCI signaling or RRC signaling.

Figure 8:
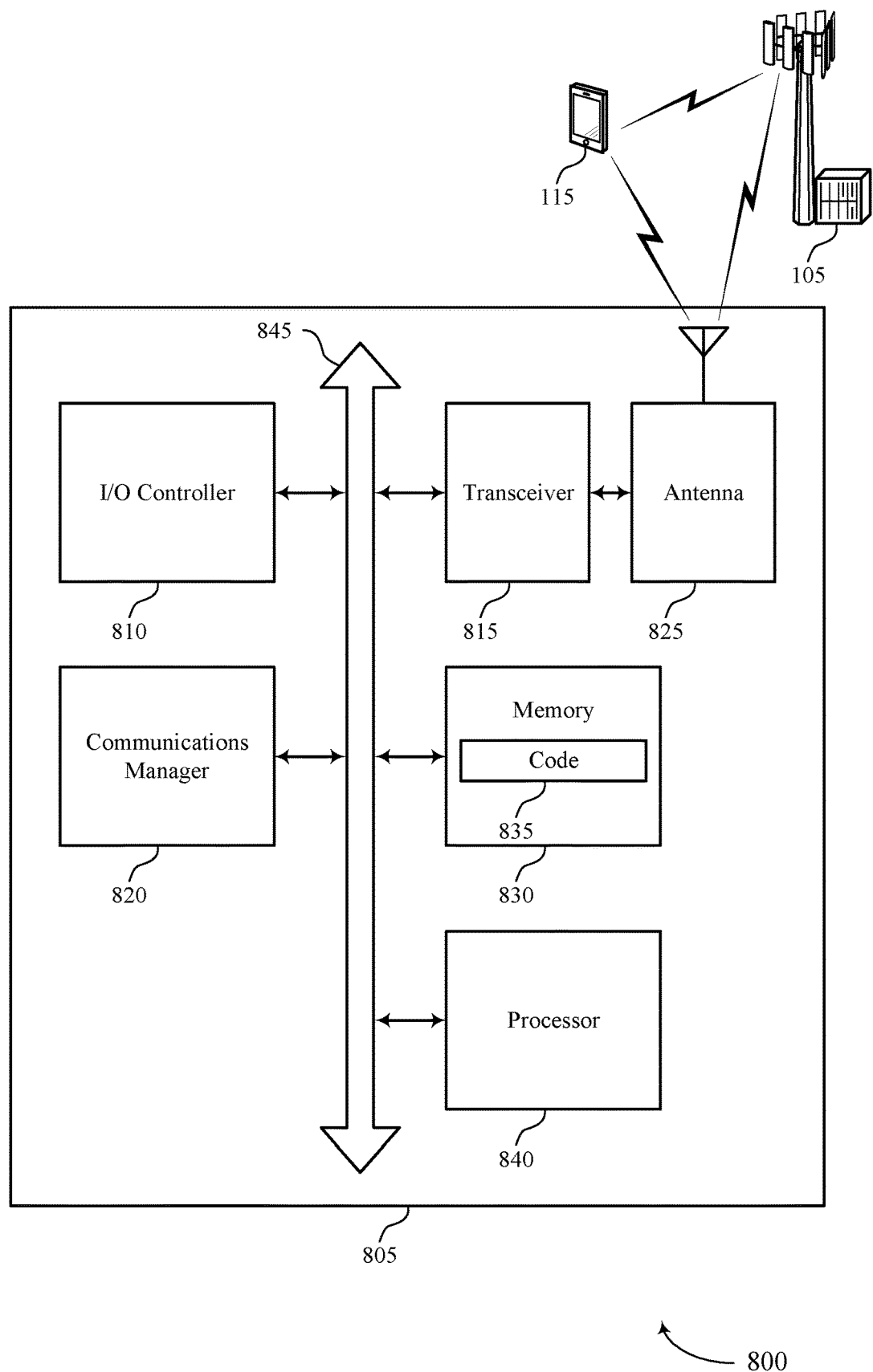
FIG. 8 shows a diagram of a system including a device that supports feedback designs for MU-MIMO sidelink communication in accordance with aspects of the present disclosure.

FIG. 8 shows a diagram of a system 800 including a device 805 that supports feedback designs for MU-MIMO sidelink communication in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback designs for MU-MIMO sidelink communication). For example, the device 805 or a component of the device 805 may include a processor 840 and memory 830 coupled to the processor 840, the processor 840 and memory 830 configured to perform various functions described herein.

The communications manager 820 may support wireless communication at a first device in accordance with examples as disclosed herein. For example, the communications manager 820 may be configured as or otherwise support a means for transmitting, to a second device, an indication of an MU-unicast mode for a first sidelink transmission. The communications manager 820 may be configured as or otherwise support a means for transmitting, to the second device, signaling associated with the first sidelink transmission. The communications manager 820 may be configured as or otherwise support a means for receiving, from the second device, feedback associated with the first sidelink transmission based on the MU-unicast mode.

Additionally or alternatively, the communications manager 820 may support wireless communication at a first UE in accordance with examples as disclosed herein. For example, the communications manager 820 may be configured as or otherwise support a means for receiving, from a second UE, an indication of an MU-unicast mode for a first sidelink transmission. The communications manager 820 may be configured as or otherwise support a means for receiving, from the second UE, the first sidelink transmission over a sidelink shared channel resource. The communications manager 820 may be configured as or otherwise support a means for transmitting, to the second UE, first feedback associated with the first sidelink transmission over a first sidelink feedback channel resource that is based on a resource mapping associated with the MU-unicast mode.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of feedback designs for MU-MIMO sidelink communication as described herein, or the processor 840 and the memory 830 may be otherwise configured to perform or support such operations.

Figure 9:
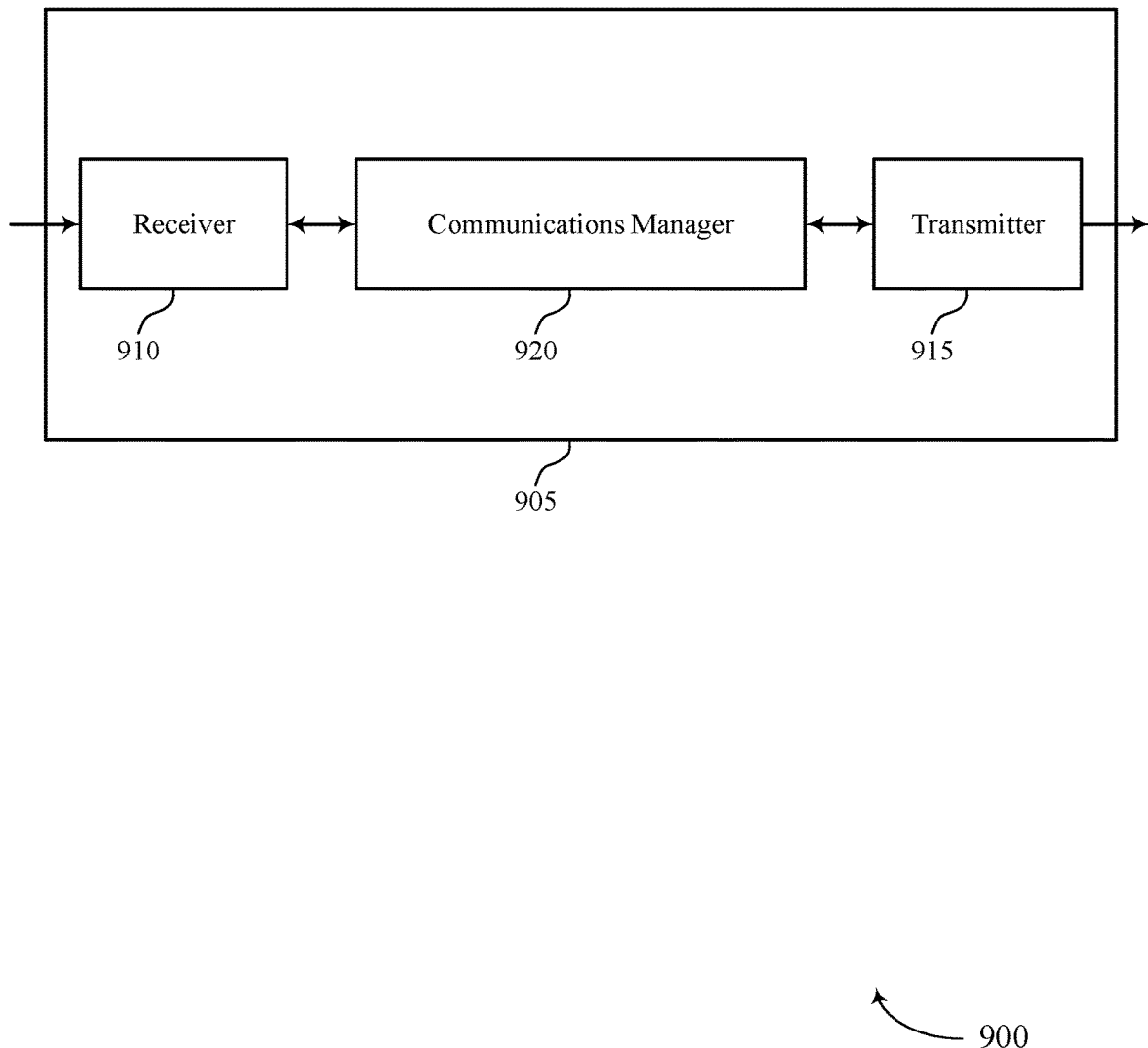
FIGS. 9 and 10 show block diagrams of devices that support feedback designs for MU-MIMO sidelink communication in accordance with aspects of the present disclosure.

FIG. 9 shows a block diagram 900 of a device 905 that supports feedback designs for MU-MIMO sidelink communication in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to feedback designs for MU-MIMO sidelink communication). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to feedback designs for MU-MIMO sidelink communication). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of feedback designs for MU-MIMO sidelink communication as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first device in accordance with examples as disclosed herein. For example, the communications manager 920 may be configured as or otherwise support a means for transmitting, to a second device, an indication of an MU-unicast mode for a first sidelink transmission. The communications manager 920 may be configured as or otherwise support a means for transmitting, to the second device, signaling associated with the first sidelink transmission. The communications manager 920 may be configured as or otherwise support a means for receiving, from the second device, feedback associated with the first sidelink transmission based on the MU-unicast mode.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources.

Figure 10:
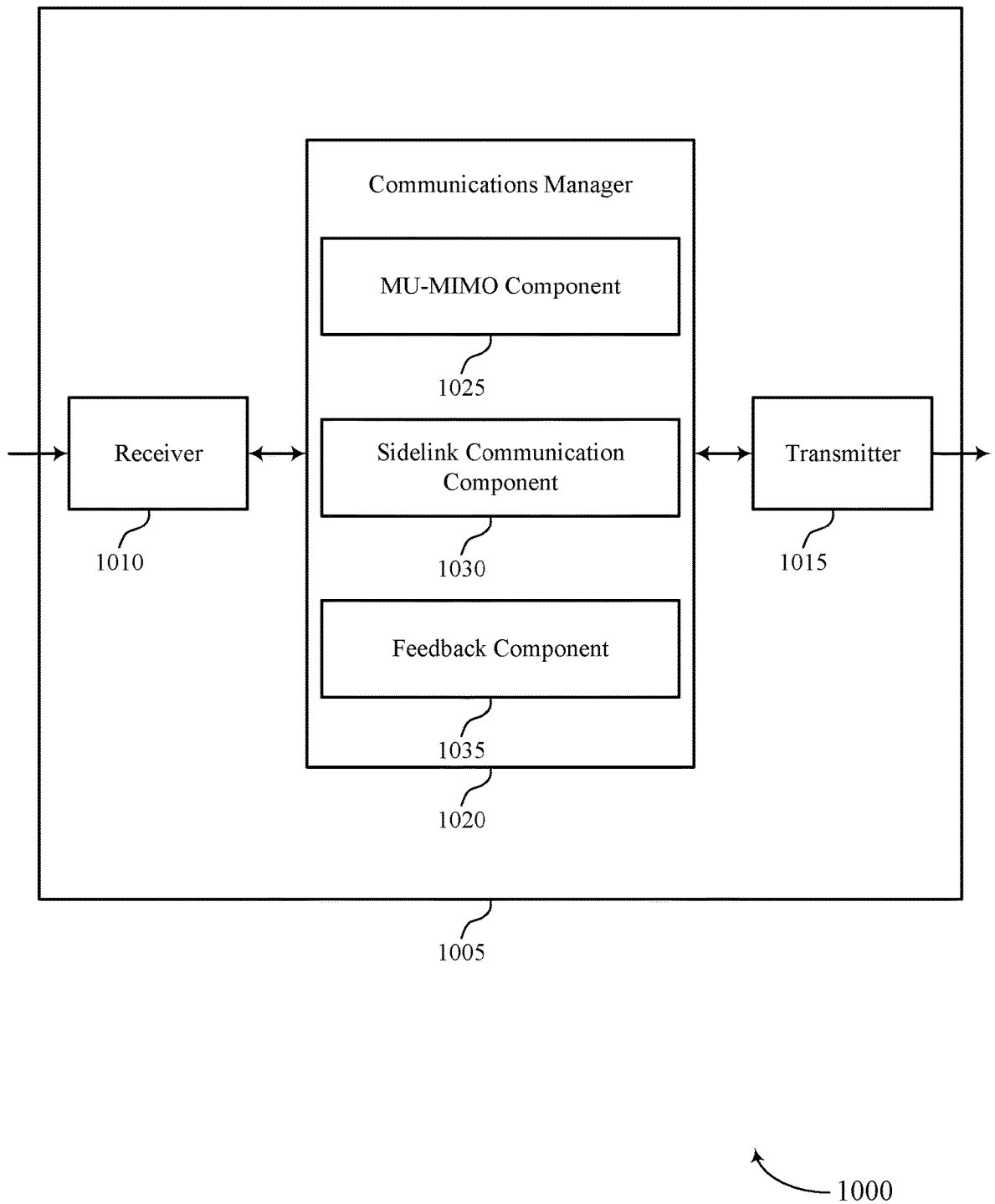

FIG. 10 shows a block diagram 1000 of a device 1005 that supports feedback designs for MU-MIMO sidelink communication in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to feedback designs for MU-MIMO sidelink communication). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to feedback designs for MU-MIMO sidelink communication). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of feedback designs for MU-MIMO sidelink communication as described herein. For example, the communications manager 1020 may include an MU-MIMO component 1025, a sidelink communication component 1030, a feedback component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first device in accordance with examples as disclosed herein. The MU-MIMO component 1025 may be configured as or otherwise support a means for transmitting, to a second device, an indication of an MU-unicast mode for a first sidelink transmission. The sidelink communication component 1030 may be configured as or otherwise support a means for transmitting, to the second device, signaling associated with the first sidelink transmission. The feedback component 1035 may be configured as or otherwise support a means for receiving, from the second device, feedback associated with the first sidelink transmission based on the MU-unicast mode.

Figure 11:
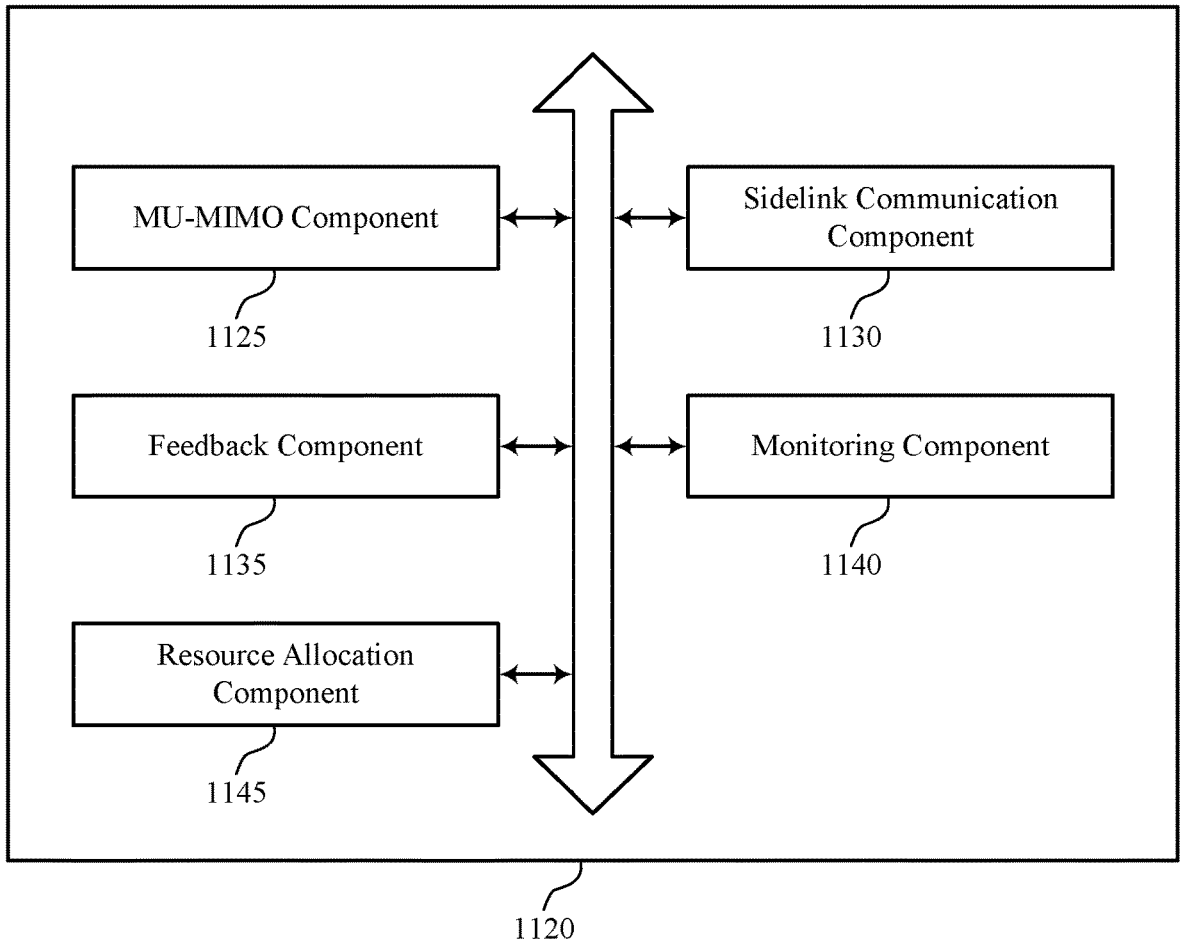
FIG. 11 shows a block diagram of a communications manager that supports feedback designs for MU-MIMO sidelink communication in accordance with aspects of the present disclosure.

FIG. 11 shows a block diagram 1100 of a communications manager 1120 that supports feedback designs for MU-MIMO sidelink communication in accordance with aspects of the present disclosure. The communications manager 1120 may be an example of aspects of a communications manager 920, a communications manager 1020, or both, as described herein. The communications manager 1120, or various components thereof, may be an example of means for performing various aspects of feedback designs for MU-MIMO sidelink communication as described herein. For example, the communications manager 1120 may include an MU-MIMO component 1125, a sidelink communication component 1130, a feedback component 1135, a monitoring component 1140, a resource allocation component 1145, or any combination thereof. Each of these components may communicate, directly or indirectly, with one another (e.g., via one or more buses).

The communications manager 1120 may support wireless communication at a first device in accordance with examples as disclosed herein. The MU-MIMO component 1125 may be configured as or otherwise support a means for transmitting, to a second device, an indication of an MU-unicast mode for a first sidelink transmission. The sidelink communication component 1130 may be configured as or otherwise support a means for transmitting, to the second device, signaling associated with the first sidelink transmission. The feedback component 1135 may be configured as or otherwise support a means for receiving, from the second device, feedback associated with the first sidelink transmission based on the MU-unicast mode.

In some examples, the first device may be an example of a base station and the second device may be an example of a UE, and the sidelink communication component 1130 may be configured as or otherwise support a means for transmitting, to the UE, a resource allocation for sidelink communication including the first sidelink transmission. In such examples, the feedback component 1135 may be configured as or otherwise support a means for receiving, from the UE, multiple feedback bits indicating an ACK or a NACK for the first sidelink transmission and a second sidelink transmission based on the MU-unicast mode.

In some examples, the multiple feedback bits indicate the ACK or the NACK for the first sidelink transmission and the second sidelink transmission per link or per spatial layer. In some examples, the first sidelink transmission and the second sidelink transmission are associated with one or more spatial layers.

In some examples, the multiple feedback bits indicate a NACK for each of a quantity of spatial layers associated with one or both of the first sidelink transmission or the second sidelink transmission, and the resource allocation component 1145 may be configured as or otherwise support a means for transmitting, to the UE, a resource allocation for a retransmission of one or both of the first sidelink transmission or the second sidelink transmission based on the quantity of spatial layers for which NACKs are received.

Figure 12:
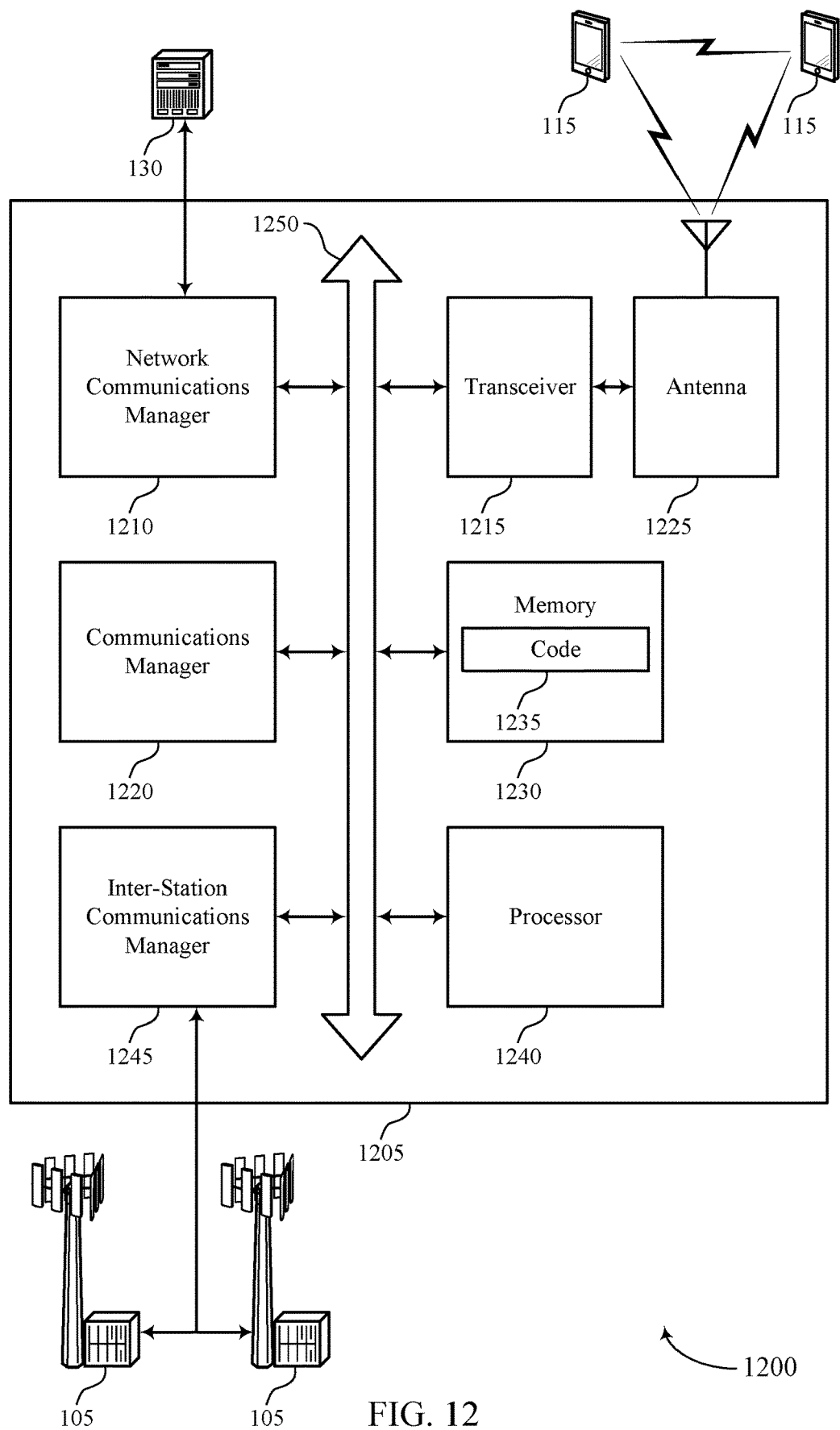
FIG. 12 shows a diagram of a system including a device that supports feedback designs for MU-MIMO sidelink communication in accordance with aspects of the present disclosure.

FIG. 12 shows a diagram of a system 1200 including a device 1205 that supports feedback designs for MU-MIMO sidelink communication in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting feedback designs for MU-MIMO sidelink communication). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a first device in accordance with examples as disclosed herein. For example, the communications manager 1220 may be configured as or otherwise support a means for transmitting, to a second device, an indication of an MU-unicast mode for a first sidelink transmission. The communications manager 1220 may be configured as or otherwise support a means for transmitting, to the second device, signaling associated with the first sidelink transmission. The communications manager 1220 may be configured as or otherwise support a means for receiving, from the second device, feedback associated with the first sidelink transmission based on the MU-unicast mode.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of feedback designs for MU-MIMO sidelink communication as described herein, or the processor 1240 and the memory 1230 may be otherwise configured to perform or support such operations.

Figure 13:
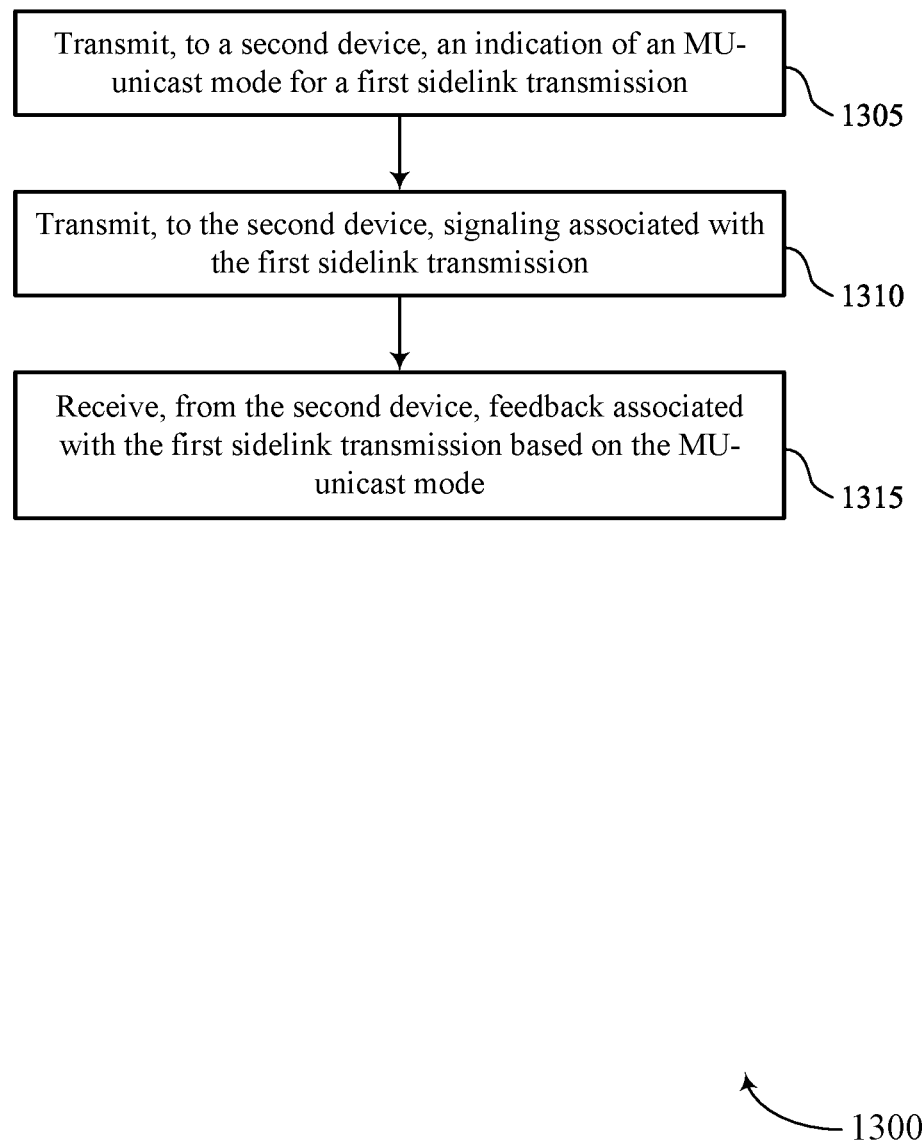
FIGS. 13 through 16 show flowcharts illustrating methods that support feedback designs for MU-MIMO sidelink communication in accordance with aspects of the present disclosure.

FIG. 13 shows a flowchart illustrating a method 1300 that supports feedback designs for MU-MIMO sidelink communication in accordance with aspects of the present disclosure. The operations of the method 1300 may be implemented by a UE or a base station or its components as described herein. For example, the operations of the method 1300 may be performed by a UE 115 as described with reference to FIGS. 1 through 8 or a base station 105 as described with reference to FIGS. 1 through 4 and 9 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1305, the method may include transmitting, to a second device, an indication of an MU-unicast mode for a first sidelink transmission. The operations of 1305 may be performed in accordance with examples as disclosed herein. In some examples, aspects of the operations of 1305 may be performed by an MU-MIMO component 725 or an MU-MIMO component 1125 as described with reference to FIGS. 7 and 11.

At 1310, the method may include transmitting, to the second device, signaling associated with the first sidelink transmission. The operations of 1310 may be performed in accordance with examples as disclosed herein. In some examples, aspects of the operations of 1310 may be performed by a sidelink communication component 730 or a sidelink communication component 1130 as described with reference to FIGS. 7 and 11.

At 1315, the method may include receiving, from the second device, feedback associated with the first sidelink transmission based on the MU-unicast mode. The operations of 1315 may be performed in accordance with examples as disclosed herein. In some examples, aspects of the operations of 1315 may be performed by a feedback component 735 or a feedback component 1135 as described with reference to FIGS. 7 and 11.

Figure 14:
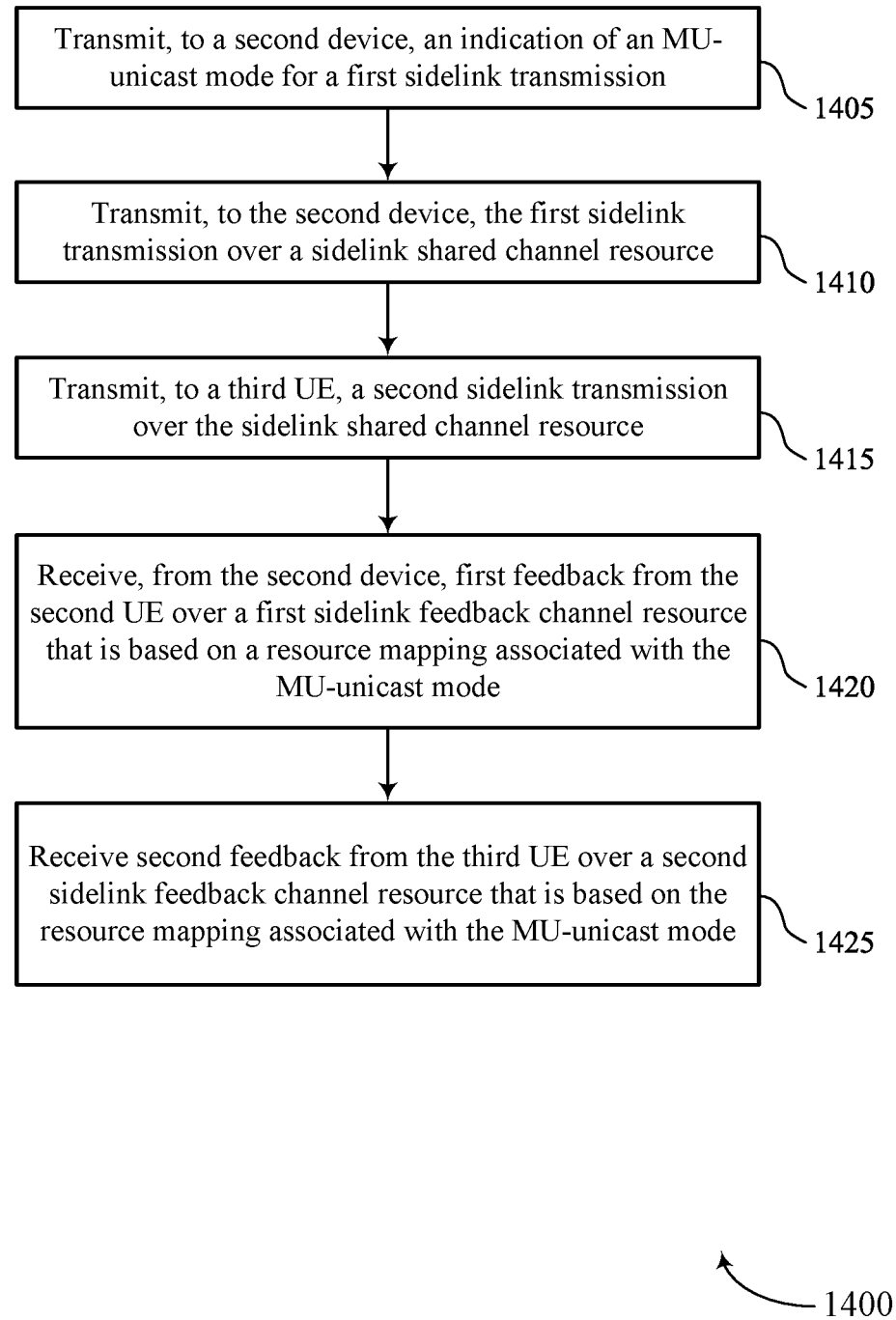

FIG. 14 shows a flowchart illustrating a method 1400 that supports feedback designs for MU-MIMO sidelink communication in accordance with aspects of the present disclosure. The operations of the method 1400 may be implemented by a UE or a base station or its components as described herein. For example, the operations of the method 1400 may be performed by a UE 115 as described with reference to FIGS. 1 through 8 or a base station 105 as described with reference to FIGS. 1 through 4 and 9 through 12. In some examples, a UE or a base station may execute a set of instructions to control the functional elements of the UE or the base station to perform the described functions. Additionally or alternatively, the UE or the base station may perform aspects of the described functions using special-purpose hardware.

At 1405, the method may include transmitting, to a second device, an indication of an MU-unicast mode for a first sidelink transmission. The operations of 1405 may be performed in accordance with examples as disclosed herein. In some examples, aspects of the operations of 1405 may be performed by an MU-MIMO component 725 or an MU-MIMO component 1125 as described with reference to FIGS. 7 and 11.

At 1410, the method may include transmitting, to the second device, the first sidelink transmission over a sidelink shared channel resource. The operations of 1410 may be performed in accordance with examples as disclosed herein. In some examples, aspects of the operations of 1410 may be performed by a sidelink communication component 730 or a sidelink communication component 1130 as described with reference to FIGS. 7 and 11.

At 1415, the method may include transmitting, to a third UE, a second sidelink transmission over the sidelink shared channel resource. The operations of 1415 may be performed in accordance with examples as disclosed herein. In some examples, aspects of the operations of 1415 may be performed by a sidelink communication component 730 or a sidelink communication component 1130 as described with reference to FIGS. 7 and 11.

At 1420, the method may include receiving, from the second device, first feedback from the second UE over a first sidelink feedback channel resource that is based on a resource mapping associated with the MU-unicast mode. The operations of 1420 may be performed in accordance with examples as disclosed herein. In some examples, aspects of the operations of 1420 may be performed by a feedback component 735 or a feedback component 1135 as described with reference to FIGS. 7 and 11.

At 1425, the method may include receiving second feedback from the third UE over a second sidelink feedback channel resource that is based on the resource mapping associated with the MU-unicast mode. The operations of 1425 may be performed in accordance with examples as disclosed herein. In some examples, aspects of the operations of 1425 may be performed by a feedback component 735 or a feedback component 1135 as described with reference to FIGS. 7 and 11.

Figure 15:
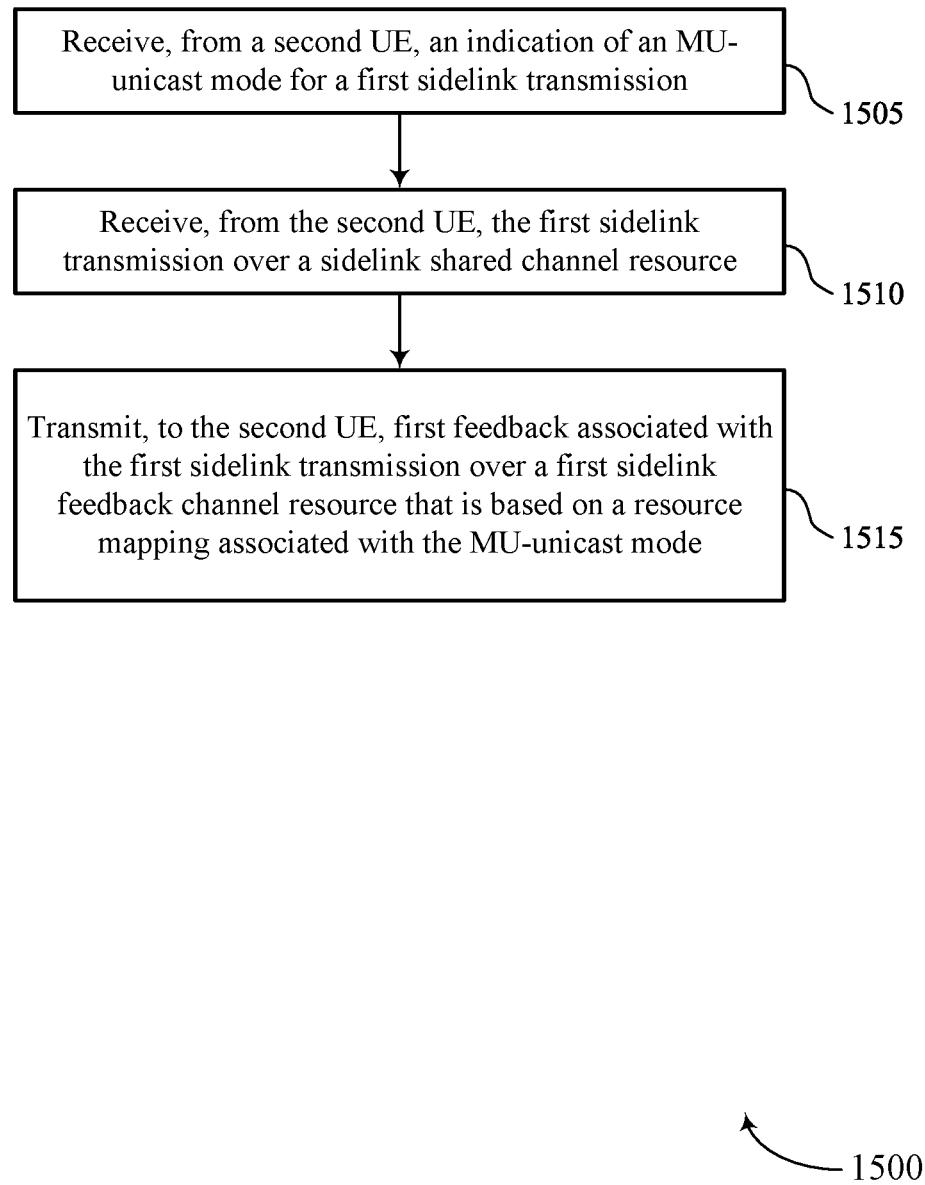

FIG. 15 shows a flowchart illustrating a method 1500 that supports feedback designs for MU-MIMO sidelink communication in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a second UE, an indication of a multi-user unicast mode for a first sidelink transmission. The operations of 1505 may be performed in accordance with examples as disclosed herein. In some examples, aspects of the operations of 1505 may be performed by an MU-MIMO component 725 as described with reference to FIG. 7.

At 1510, the method may include receiving, from the second UE, the first sidelink transmission over a sidelink shared channel resource. The operations of 1510 may be performed in accordance with examples as disclosed herein. In some examples, aspects of the operations of 1510 may be performed by a sidelink communication component 730 as described with reference to FIG. 7.

At 1515, the method may include transmitting, to the second UE, first feedback associated with the first sidelink transmission over a first sidelink feedback channel resource that is based on a resource mapping associated with the multi-user unicast mode. The operations of 1515 may be performed in accordance with examples as disclosed herein. In some examples, aspects of the operations of 1515 may be performed by a feedback component 735 as described with reference to FIG. 7.

Figure 16:
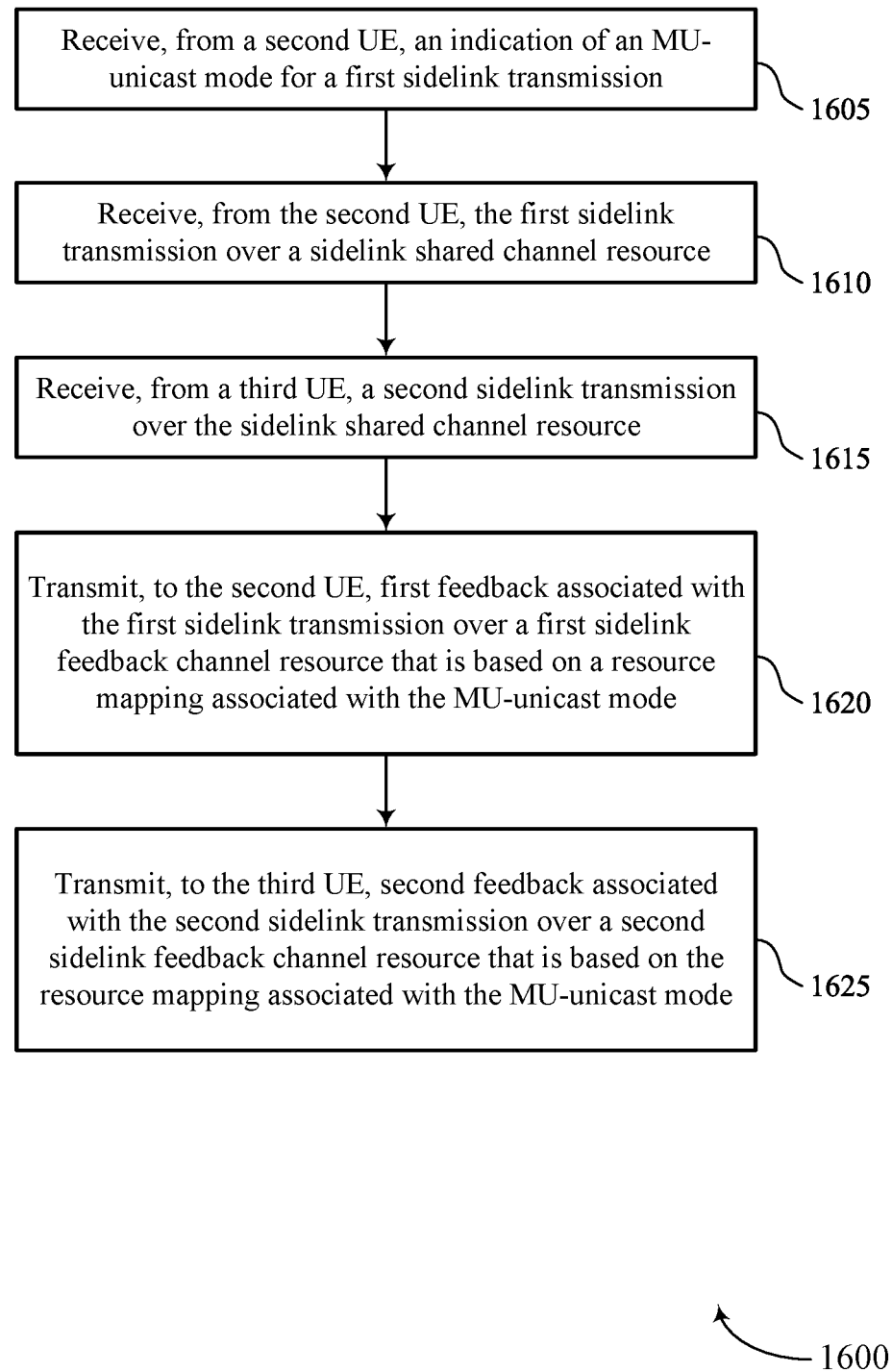

FIG. 16 shows a flowchart illustrating a method 1600 that supports feedback designs for MU-MIMO sidelink communication in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a second UE, an indication of an MU-unicast mode for a first sidelink transmission. The operations of 1605 may be performed in accordance with examples as disclosed herein. In some examples, aspects of the operations of 1605 may be performed by an MU-MIMO component 725 as described with reference to FIG. 7.

At 1610, the method may include receiving, from the second UE, the first sidelink transmission over a sidelink shared channel resource. The operations of 1610 may be performed in accordance with examples as disclosed herein. In some examples, aspects of the operations of 1610 may be performed by a sidelink communication component 730 as described with reference to FIG. 7.

At 1620, the method may include receiving, from a third UE, a second sidelink transmission over the sidelink shared channel resource. The operations of 1620 may be performed in accordance with examples as disclosed herein. In some examples, aspects of the operations of 1620 may be performed by a sidelink communication component 730 as described with reference to FIG. 7.

At 1615, the method may include transmitting, to the second UE, first feedback associated with the first sidelink transmission over a first sidelink feedback channel resource that is based on a resource mapping associated with the MU-unicast mode. The operations of 1615 may be performed in accordance with examples as disclosed herein. In some examples, aspects of the operations of 1615 may be performed by a feedback component 735 as described with reference to FIG. 7.

At 1625, the method may include transmitting, to the third UE, second feedback associated with the second sidelink transmission over a second sidelink feedback channel resource that is based on the resource mapping associated with the MU-unicast mode. The operations of 1625 may be performed in accordance with examples as disclosed herein. In some examples, aspects of the operations of 1625 may be performed by a feedback component 735 as described with reference to FIG. 7.

The following provides an overview of aspects of the present disclosure:

Aspect 1: A method for wireless communication at a first device, comprising: transmitting, to a second device, an indication of an MU unicast mode for a first sidelink transmission; transmitting, to the second device, signaling associated with the first sidelink transmission; and receiving, from the second device, feedback associated with the first sidelink transmission based at least in part on the MU unicast mode.

Aspect 2: The method of aspect 1, wherein the first device comprises a first UE and the second device comprises a second UE, and wherein: transmitting the signaling associated with the first sidelink transmission comprises transmitting, to the second UE, the first sidelink transmission over a sidelink shared channel resource; and receiving the feedback associated with the first sidelink transmission comprises receiving first feedback from the second UE over a first sidelink feedback channel resource that is based at least in part on a resource mapping associated with the MU unicast mode.

Aspect 3: The method of aspect 2, further comprising: transmitting, to a third UE, a second sidelink transmission over the sidelink shared channel resource; and receiving second feedback from the third UE over a second sidelink feedback channel resource that is based at least in part on the resource mapping associated with the MU unicast mode.

Aspect 4: The method of any of aspects 2 or 3, further comprising: monitoring over the first sidelink feedback channel resource for the first feedback from the second UE based at least in part on a source ID associated with the first UE and a destination ID associated with the second UE, wherein a function of the source ID associated with the first UE and the destination ID associated with the second UE indicates the first sidelink feedback channel resource in accordance with the resource mapping associated with the MU unicast mode.

Aspect 5: The method of any of aspects 2 through 4, further comprising: monitoring over the first sidelink feedback channel resource for the first feedback from the second UE based at least in part on a parameter associated with one or more DMRS ports for the sidelink shared channel resource and a source ID associated with the first UE, wherein a function of the parameter and the source ID associated with the first UE indicates the first sidelink feedback channel resource in accordance with the resource mapping associated with the MU unicast mode.

Aspect 6: The method of any of aspects 2 through 5, further comprising: monitoring over the first sidelink feedback channel resource for the first feedback from the second UE based at least in part on one or both of a parameter associated with one or more DMRS ports or an OCC index for a sidelink control channel resource associated with the first sidelink transmission and a source ID associated with the first UE, wherein a function of one or both of the parameter or the OCC index and the source ID associated with the first UE indicates the first sidelink feedback channel resource in accordance with the resource mapping associated with the MU unicast mode.

Aspect 7: The method of any of aspects 2 through 6, further comprising: monitoring over the first sidelink feedback channel resource for the first feedback from the second UE based at least in part on a source ID associated with the first UE and an offset value, wherein a function of the source ID associated with the first UE and the offset value indicates the first sidelink feedback channel resource in accordance with the resource mapping associated with the MU unicast mode.

Aspect 8: The method of aspect 7, further comprising: transmitting, to the second UE, an indication of the offset value via SCI signaling or RRC signaling.

Aspect 9: The method of any of aspects 2 through 8, further comprising: receiving, from a base station, a resource allocation including a single sidelink shared channel resource for sidelink communication and a single uplink control channel resource for feedback associated with the sidelink communication; transmitting, to a third UE, a second sidelink transmission over the single sidelink shared channel resource, wherein the first sidelink transmission to the second UE is also transmitted over the single sidelink shared channel resource; and transmitting, to the base station over the single uplink control channel resource, feedback associated with the first sidelink transmission and the second sidelink transmission.

Aspect 10: The method of aspect 9, wherein the feedback associated with the first sidelink transmission and the second sidelink transmission comprises one feedback bit, and the one feedback bit indicates an ACK if both the first sidelink transmission and the second sidelink transmission are successful or a NACK if at least one of the first sidelink transmission or the second sidelink transmission is unsuccessful.

Aspect 11: The method of aspect 9, wherein the feedback associated with the first sidelink transmission and the second sidelink transmission comprises multiple feedback bits, and the multiple feedback bits indicate an ACK or a NACK for the first sidelink transmission and the second sidelink transmission.

Aspect 12: The method of aspect 11, wherein the multiple feedback bits indicate the feedback associated with the first sidelink transmission and the second sidelink transmission per link or per spatial layer, and the first sidelink transmission and the second sidelink transmission are associated with one or more spatial layers.

Aspect 13: The method of aspect 12, wherein the multiple feedback bits indicate a NACK for each of a quantity of spatial layers associated with one or both of the first sidelink transmission or the second sidelink transmission, the method further comprising: receiving, from the base station, a resource allocation for a retransmission of one or both of the first sidelink transmission or the second sidelink transmission based at least in part on the quantity of spatial layers for which NACKs are transmitted.

Aspect 14: The method of aspect 1, wherein the first device comprises a base station and the second device comprises a UE, and wherein: transmitting the signaling associated with the first sidelink transmission comprises transmitting, to the UE, a resource allocation for sidelink communication including the first sidelink transmission; and receiving the feedback associated with the first sidelink transmission comprises receiving, from the UE, multiple feedback bits indicating an ACK or a NACK for the first sidelink transmission and a second sidelink transmission based at least in part on the MU unicast mode.

Aspect 15: The method of aspect 14, wherein the multiple feedback bits indicate the ACK or the NACK for the first sidelink transmission and the second sidelink transmission per link or per spatial layer, and the first sidelink transmission and the second sidelink transmission are associated with one or more spatial layers.

Aspect 16: The method of aspect 15, wherein the multiple feedback bits indicate a NACK for each of a quantity of spatial layers associated with one or both of the first sidelink transmission or the second sidelink transmission, the method further comprising: transmitting, to the UE, a resource allocation for a retransmission of one or both of the first sidelink transmission or the second sidelink transmission based at least in part on the quantity of spatial layers for which NACKs are received.

Aspect 17: A method for wireless communication at a first UE, comprising: receiving, from a second UE, an indication of an MU unicast mode for a first sidelink transmission; receiving, from the second UE, the first sidelink transmission over a sidelink shared channel resource; and transmitting, to the second UE, first feedback associated with the first sidelink transmission over a first sidelink feedback channel resource that is based at least in part on a resource mapping associated with the MU unicast mode.

Aspect 18: The method of aspect 17, further comprising: receiving, from a third UE, a second sidelink transmission over the sidelink shared channel resource; and transmitting, to the third UE, second feedback associated with the second sidelink transmission over a second sidelink feedback channel resource that is based at least in part on the resource mapping associated with the MU unicast mode.

Aspect 19: The method of any of aspects 17 or 18, further comprising: selecting the first sidelink feedback channel resource for the first feedback associated with the first sidelink transmission based at least in part on a source ID associated with the second UE and a destination ID associated with the first UE, wherein a function of the source ID associated with the second UE and the destination ID associated with the first UE indicates the first sidelink feedback channel resource in accordance with the resource mapping associated with the MU unicast mode.

Aspect 20: The method of any of aspects 17 through 19, further comprising: selecting the first sidelink feedback channel resource for the first feedback associated with the first sidelink transmission based at least in part on a parameter associated with one or more DMRS ports for the sidelink shared channel resource and a source ID associated with the second UE, wherein a function of the parameter and the source ID associated with the second UE indicates the first sidelink feedback channel resource in accordance with the resource mapping associated with the MU unicast mode.

Aspect 21: The method of any of aspects 17 through 20, further comprising: selecting the first sidelink feedback channel resource for the first feedback associated with the first sidelink transmission based at least in part on one or both of a parameter associated with one or more DMRS ports or an OCC index for a sidelink control channel resource associated with the first sidelink transmission and a source ID associated with the second UE, wherein a function of one or both of the parameter or the OCC index and the source ID associated with the second UE indicates the first sidelink feedback channel resource in accordance with the resource mapping associated with the MU unicast mode.

Aspect 22: The method of any of aspects 17 through 21, further comprising: selecting the first sidelink feedback channel resource for the first feedback associated with the first sidelink transmission based at least in part on a source ID associated with the second UE and an offset value, wherein a function of the source ID associated with the second UE and the offset value indicates the first sidelink feedback channel resource in accordance with the resource mapping associated with the MU unicast mode.

Aspect 23: The method of aspect 22, further comprising: receiving, from the second UE, an indication of the offset value via SCI signaling or RRC signaling.

Aspect 24: An apparatus for wireless communication at a first device, comprising a processor; memory coupled with the processor; and instructions stored in the memory and executable by the processor to cause the apparatus to perform a method of any of aspects 1 through 16.

Aspect 25: An apparatus for wireless communication at a first device, comprising at least one means for performing a method of any of aspects 1 through 16.

Aspect 26: A non-transitory computer-readable medium storing code for wireless communication at a first device, the code comprising instructions executable by a processor to perform a method of any of aspects 1 through 16.

Aspect 27: An apparatus for wireless communication at a first UE, comprising a processor; memory coupled with the processor; and instructions stored in the memory and executable by the processor to cause the apparatus to perform a method of any of aspects 17 through 23.

Aspect 28: An apparatus for wireless communication at a first UE, comprising at least one means for performing a method of any of aspects 17 through 23.

Aspect 29: A non-transitory computer-readable medium storing code for wireless communication at a first UE, the code comprising instructions executable by a processor to perform a method of any of aspects 17 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
    transmitting, to a second device, an indication of a multi-user unicast mode for a first sidelink transmission, wherein operation in the multi-user unicast mode comprises transmitting sidelink multi-user multiple-input multiple-output (MU-MIMO) transmissions;
    transmitting, to the second device, signaling associated with the first sidelink transmission; and
    receiving, from the second device and via a first sidelink feedback channel resource, feedback associated with the first sidelink transmission based at least in part on the multi-user unicast mode, wherein the first sidelink feedback channel resource is identified based at least in part on a function of a source identifier associated with the first device and an orthogonal cover code index for a sidelink control channel associated with the first sidelink transmission.

2. The method of claim 1, wherein the first device comprises a first user equipment (UE) and the second device comprises a second UE, and wherein:
    transmitting the signaling associated with the first sidelink transmission comprises transmitting, to the second UE, the first sidelink transmission over a sidelink shared channel resource; and
    receiving the feedback associated with the first sidelink transmission comprises receiving first feedback from the second UE over the first sidelink feedback channel resource that is based at least in part on a resource mapping associated with the multi-user unicast mode.

3. The method of claim 2, further comprising:
    transmitting, to a third UE, a second sidelink transmission over the sidelink shared channel resource; and
    receiving second feedback from the third UE over a second sidelink feedback channel resource that is based at least in part on the resource mapping associated with the multi-user unicast mode.

4. The method of claim 3, further comprising:
    monitoring over the second sidelink feedback channel resource for the second feedback from the third UE based at least in part on a source identifier associated with the first UE and a destination identifier associated with the third UE, wherein a function of the source identifier associated with the first UE and the destination identifier associated with the third UE indicates the second sidelink feedback channel resource in accordance with the resource mapping associated with the multi-user unicast mode.

5. The method of claim 3, further comprising:
monitoring over the second sidelink feedback channel resource for the second feedback from the third UE based at least in part on a parameter associated with one or more demodulation reference signal (DMRS) ports for the sidelink shared channel resource and a source identifier associated with the first UE, wherein a function of the parameter and the source identifier associated with the first UE indicates the second sidelink feedback channel resource in accordance with the resource mapping associated with the multi-user unicast mode.

6. The method of claim 3, further comprising:
monitoring over the second sidelink feedback channel resource for the second feedback from the third UE based at least in part on one or both of a parameter associated with one or more demodulation reference signal (DMRS) ports or an orthogonal cover code index for a sidelink control channel resource associated with the second sidelink transmission and a source identifier associated with the first UE, wherein a function of one or both of the parameter or the orthogonal cover code index and the source identifier associated with the first UE indicates the second sidelink feedback channel resource in accordance with the resource mapping associated with the multi-user unicast mode.

7. The method of claim 3, further comprising:
monitoring over the second sidelink feedback channel resource for the second feedback from the third UE based at least in part on a source identifier associated with the first UE and an offset value, wherein a function of the source identifier associated with the first UE and the offset value indicates the second sidelink feedback channel resource in accordance with the resource mapping associated with the multi-user unicast mode.

8. The method of claim 7, further comprising:
transmitting, to the third UE, an indication of the offset value via sidelink control information signaling or radio resource control signaling.

9. The method of claim 2, further comprising:
receiving, from a network node, a resource allocation including a single sidelink shared channel resource for sidelink communication and a single uplink control channel resource for feedback associated with the sidelink communication;
transmitting, to a third UE, a second sidelink transmission over the single sidelink shared channel resource, wherein the first sidelink transmission to the second UE is also transmitted over the single sidelink shared channel resource; and
transmitting, to the network node over the single uplink control channel resource, feedback associated with the first sidelink transmission and the second sidelink transmission.

10. The method of claim 9, wherein the feedback associated with the first sidelink transmission and the second sidelink transmission comprises one feedback bit, and the one feedback bit indicates an acknowledgement if both the first sidelink transmission and the second sidelink transmission are successful or a negative acknowledgement if at least one of the first sidelink transmission or the second sidelink transmission is unsuccessful.

11. The method of claim 9, wherein the feedback associated with the first sidelink transmission and the second sidelink transmission comprises multiple feedback bits, and the multiple feedback bits indicate an acknowledgement or a negative acknowledgement for the first sidelink transmission and the second sidelink transmission.

12. The method of claim 11, wherein the multiple feedback bits indicate the feedback associated with the first sidelink transmission and the second sidelink transmission per link or per spatial layer, and the first sidelink transmission and the second sidelink transmission are associated with one or more spatial layers.

13. The method of claim 12, wherein the multiple feedback bits indicate a negative acknowledgement for each of a quantity of spatial layers associated with one or both of the first sidelink transmission or the second sidelink transmission, the method further comprising:
receiving, from the network node, a resource allocation for a retransmission of one or both of the first sidelink transmission or the second sidelink transmission based at least in part on the quantity of spatial layers for which negative acknowledgements are transmitted.

14. The method of claim 1, further comprising
receiving, from a network node, a resource allocation for sidelink communication including the first sidelink transmission, wherein transmitting the signaling associated with the first sidelink transmission is in accordance with the resource allocation; and
transmitting, to the network node, multiple feedback bits indicating an acknowledgement or a negative acknowledgement for the first sidelink transmission and a second sidelink transmission based at least in part on the multi-user unicast mode.

15. The method of claim 14, wherein the multiple feedback bits indicate the acknowledgement or the negative acknowledgement for the first sidelink transmission and the second sidelink transmission per link or per spatial layer, and the first sidelink transmission and the second sidelink transmission are associated with one or more spatial layers.

16. The method of claim 15, wherein the multiple feedback bits indicate a negative acknowledgement for each of a quantity of spatial layers associated with one or both of the first sidelink transmission or the second sidelink transmission, the method further comprising:
receiving a resource allocation for a retransmission of one or both of the first sidelink transmission or the second sidelink transmission based at least in part on the quantity of spatial layers for which negative acknowledgements are received.

17. A method for wireless communication at a first user equipment (UE), comprising:
receiving, from a second UE, an indication of a multi-user unicast mode for a first sidelink transmission, wherein operation in the multi-user unicast mode comprises receiving sidelink multi-user multiple-input multiple-output (MU-MIMO) transmissions;
receiving, from the second UE, the first sidelink transmission over a sidelink shared channel resource; and
transmitting, to the second UE, first feedback associated with the first sidelink transmission over a first sidelink feedback channel resource, wherein the first sidelink feedback channel resource is selected based at least in part on a function of a source identifier associated with the second UE and an orthogonal cover code index for a sidelink control channel associated with the first sidelink transmission in accordance with a resource mapping associated with the multi-user unicast mode.

18. The method of claim 17, further comprising:
receiving, from a third UE, a second sidelink transmission over the sidelink shared channel resource; and
transmitting, to the third UE, second feedback associated with the second sidelink transmission over a second sidelink feedback channel resource that is based at least in part on the resource mapping associated with the multi-user unicast mode.

19. The method of claim 18, further comprising:
selecting the second sidelink feedback channel resource for the second feedback associated with the second sidelink transmission based at least in part on a source identifier associated with the third UE and a destination identifier associated with the first UE, wherein a function of the source identifier associated with the third UE and the destination identifier associated with the first UE indicates the second sidelink feedback channel resource in accordance with the resource mapping associated with the multi-user unicast mode.

20. The method of claim 18, further comprising:
selecting the second sidelink feedback channel resource for the second feedback associated with the second sidelink transmission based at least in part on a parameter associated with one or more demodulation reference signal (DMRS) ports for the sidelink shared channel resource and a source identifier associated with the third UE, wherein a function of the parameter and the source identifier associated with the third UE indicates the second sidelink feedback channel resource in accordance with the resource mapping associated with the multi-user unicast mode.

21. The method of claim 18, further comprising:
selecting the second sidelink feedback channel resource for the second feedback associated with the second sidelink transmission based at least in part on one or both of a parameter associated with one or more demodulation reference signal (DMRS) ports or an orthogonal cover code index for a sidelink control channel resource associated with the second sidelink transmission and a source identifier associated with the third UE, wherein a function of one or both of the parameter or the orthogonal cover code index and the source identifier associated with the third UE indicates the second sidelink feedback channel resource in accordance with the resource mapping associated with the multi-user unicast mode.

22. The method of claim 18, further comprising:
selecting the second sidelink feedback channel resource for the second feedback associated with the second sidelink transmission based at least in part on a source identifier associated with the third UE and an offset value, wherein a function of the source identifier associated with the third UE and the offset value indicates the second sidelink feedback channel resource in accordance with the resource mapping associated with the multi-user unicast mode.

23. The method of claim 22, further comprising:
receiving, from the third UE, an indication of the offset value via sidelink control information signaling or radio resource control signaling.

24. A first device, comprising:
one or more memories; and
one or more processors coupled with the one or more memories, and configured to cause the first device to:
transmit, to a second device, an indication of a multi-user unicast mode for a first sidelink transmission, wherein operation in the multi-user unicast mode comprises transmitting sidelink multi-user multiple-input multiple-output (MU-MIMO) transmissions;
transmit, to the second device, signaling associated with the first sidelink transmission; and
receive, from the second device and via a first sidelink feedback channel resource, feedback associated with the first sidelink transmission based at least in part on the multi-user unicast mode, wherein the first sidelink feedback channel resource is identified based at least in part on a function of a source identifier associated with the first device and an orthogonal cover code index for a sidelink control channel associated with the first sidelink transmission.

25. The first device of claim 24, wherein the first device comprises a first user equipment (UE) and the second device comprises a second UE, and wherein the one or more processors are configured to cause the first device to:
transmit, to the second UE, the first sidelink transmission over a sidelink shared channel resource; and
receive first feedback from the second UE over the first sidelink feedback channel resource that is based at least in part on a resource mapping associated with the multi-user unicast mode.

26. The first device of claim 25, wherein the one or more processors are further configured to cause the first device to:
transmit, to a third UE, a second sidelink transmission over the sidelink shared channel resource; and
receive second feedback from the third UE over a second sidelink feedback channel resource that is based at least in part on the resource mapping associated with the multi-user unicast mode.

27. The first device of claim 25, the one or more processors are further configured to cause the first device to:
receive, from a network node, a resource allocation including a single sidelink shared channel resource for sidelink communication and a single uplink control channel resource for feedback associated with the sidelink communication;
transmit, to a third UE, a second sidelink transmission over the single sidelink shared channel resource, wherein the first sidelink transmission to the second UE is also transmitted over the single sidelink shared channel resource; and
transmit, to the network node over the single uplink control channel resource, feedback associated with the first sidelink transmission and the second sidelink transmission.

28. The first device of claim 27, wherein:
the feedback associated with the first sidelink transmission and the second sidelink transmission comprises one feedback bit, and the one feedback bit indicates an acknowledgement if both the first sidelink transmission and the second sidelink transmission are successful or a negative acknowledgement if at least one of the first sidelink transmission or the second sidelink transmission is unsuccessful; or
the feedback associated with the first sidelink transmission and the second sidelink transmission comprises multiple feedback bits, and the multiple feedback bits indicate the acknowledgement or the negative acknowledgement for the first sidelink transmission and the second sidelink transmission.

29. A first user equipment (UE), comprising:
one or more memories; and
one or more processors coupled with the one or more memories, and configured to cause the first UE to:
receive, from a second UE, an indication of a multi-user unicast mode for a first sidelink transmission, wherein operation in the multi-user unicast mode comprises receiving sidelink multi-user multiple-input multiple-output (MU-MIMO) transmissions;
receive, from the second UE, the first sidelink transmission over a sidelink shared channel resource; and
transmit, to the second UE, first feedback associated with the first sidelink transmission over a first sidelink feedback channel resource, wherein the first sidelink feedback channel resource is selected based at least in part on a function of a source identifier associated with the second UE and an orthogonal cover code index for a sidelink control channel associated with the first sidelink transmission in accordance with a resource mapping associated with the multi-user unicast mode.

30. The first UE of claim 29, wherein the one or more processors are further configured to cause the first UE to:
receive, from a third UE, a second sidelink transmission over the sidelink shared channel resource; and
transmit, to the third UE, second feedback associated with the second sidelink transmission over a second sidelink feedback channel resource that is based at least in part on the resource mapping associated with the multi-user unicast mode.

* * * * *